(12) United States Patent
Horst et al.

(10) Patent No.: US 9,010,773 B2
(45) Date of Patent: Apr. 21, 2015

(54) BABY CARRIAGE AND FRAME THEREOF

(71) Applicants: Andrew J. Horst, West Lawn, PA (US); Dylan A. Mellinger, Narvon, PA (US); Curtis M. Hartenstine, Birdsboro, PA (US); Andrew J. Winterhalter, West Lawn, PA (US)

(72) Inventors: Andrew J. Horst, West Lawn, PA (US); Dylan A. Mellinger, Narvon, PA (US); Curtis M. Hartenstine, Birdsboro, PA (US); Andrew J. Winterhalter, West Lawn, PA (US)

(73) Assignee: Wonderland Nurserygoods Company Limited, Kingswin Industrial Building, Kwai Chung, N.T. (HK)

( * ) Notice: Subject to any disclaimer, the term of this patent is extended or adjusted under 35 U.S.C. 154(b) by 106 days.

(21) Appl. No.: 13/853,066

(22) Filed: Mar. 29, 2013

(65) Prior Publication Data
US 2013/0257002 A1    Oct. 3, 2013

Related U.S. Application Data

(60) Provisional application No. 61/686,037, filed on Mar. 29, 2012, provisional application No. 61/851,293, filed on Mar. 5, 2013.

(51) Int. Cl.
*B62B 7/00*       (2006.01)
*B62B 7/14*       (2006.01)

(52) U.S. Cl.
CPC .................. *B62B 7/008* (2013.01); *B62B 7/142* (2013.01); *B62B 7/14* (2013.01); *B62B 7/145* (2013.01)

(58) Field of Classification Search
CPC .......... B62B 9/18; B62B 7/008; B62B 7/006; B62B 7/14; B62B 7/142; B62B 7/145

USPC .............. 280/642, 647, 650, 658, 657, 47.38, 280/47.41, 64, 47.418
See application file for complete search history.

(56) References Cited

U.S. PATENT DOCUMENTS

| | | | |
|---|---|---|---|
| 1,671,774 A * | 5/1928 | McIntosh | 16/35 R |
| 1,707,186 A * | 3/1929 | Chatfield | 280/658 |
| 7,032,922 B1 * | 4/2006 | Lan | 280/648 |
| 7,871,100 B2 * | 1/2011 | Chen et al. | 280/642 |
| 8,157,273 B2 * | 4/2012 | Bar-Lev | 280/47.39 |
| 8,251,382 B2 * | 8/2012 | Chen et al. | 280/47.41 |
| D686,541 S * | 7/2013 | Lai | D12/129 |
| 8,585,075 B2 * | 11/2013 | Zhong | 280/648 |
| 8,651,502 B2 * | 2/2014 | Winterhalter et al. | 280/47.4 |
| 8,727,370 B2 * | 5/2014 | Tsai | 280/648 |
| 2005/0167951 A1 * | 8/2005 | Zhen | 280/642 |

(Continued)

FOREIGN PATENT DOCUMENTS

CN          202518316 U     11/2012
DE     20 2009 005 213 U1    1/2010

(Continued)

*Primary Examiner* — J. Allen Shriver, II
*Assistant Examiner* — Emma K Frick
(74) *Attorney, Agent, or Firm* — Winston Hsu; Scott Margo

(57) ABSTRACT

A frame for a baby carriage includes two side supporting members, a handling member, a traverse connecting member and a central supporting member. The handling member has opposite ends connected to the two side supporting members, respectively. The traverse connecting member has opposite ends connected to the two side supporting members, respectively and spaced apart from the handling member. The central supporting member is arranged between the two side supporting members so as to form two side-by-side seat areas and terminating at the traverse connecting member so as to form a T-shaped structure.

9 Claims, 27 Drawing Sheets

(56) References Cited

U.S. PATENT DOCUMENTS

| | | |
|---|---|---|
| 2007/0194545 A1 | 8/2007 | Van Dijk |
| 2010/0052277 A1* | 3/2010 | Zehfuss .................... 280/47.35 |
| 2011/0163519 A1 | 7/2011 | Van Gelderen |
| 2012/0118516 A1 | 5/2012 | Macauley |

FOREIGN PATENT DOCUMENTS

| | | |
|---|---|---|
| DE | 10 2010 011 620 A1 | 9/2010 |
| DE | 20 2013 100 540 U1 | 4/2013 |
| EP | 1 190 930 A2 | 3/2002 |
| EP | 1 190 930 A3 | 6/2003 |
| EP | 1 700 770 A1 | 9/2006 |
| EP | 2 258 601 A1 | 12/2010 |
| GB | 2 193 692 A | 2/1988 |
| JP | 2001260894 A | 9/2001 |
| WO | 2007131222 A2 | 11/2007 |
| WO | 2007131222 A3 | 11/2007 |

* cited by examiner

BABY CARRIAGE AND FRAME THEREOF

CROSS REFERENCE TO RELATED APPLICATIONS

This application claims the benefit of U.S. Provisional Application No. 61/686,037, which was filed on Mar. 29, 2012, and is incorporated herein by reference and U.S. Provisional Application Title "Slot Guard System", which was filed on Mar. 5, 2013, and is incorporated herein by reference.

BACKGROUND OF THE INVENTION

1. Field of the Invention

The invention relates to a baby carriage and, more particularly, to a frame with a T-shaped structure for a baby carriage and a baby carriage allowing for two infant carriers to be attached at the same time and capable of preventing a finger from entering a potentially harmful slot.

2. Description of the Prior Art

A current side by side duo stroller does not allow for two full sized infant car seats to be attached at the same time. For parents of twins, this means that one infant is removed from the infant car seat and placed into a full sized stroller seat. Most stroller seats are not as supportive, comfortable, convenient, or safe as an infant car seat for young infants.

Furthermore, safety is the utmost concern in the juvenile products industry. In the past, there have been incidents of children's fingers getting injured by two parts shearing past one another strollers.

Moreover, the conventional duo stroller has a central tube that extends from a handle tube directly. Since the central tube terminates at the top of the handle tube, the handle grip and parent tray, if present, is divided by the central tube into left and right segments. The user is forced to separate their hands into these segments therefore loosing hand positioning flexibility. The user must bridge the central tube at all times to effectively steer the wider and more difficult handling stroller. The parent tray, which is also segmented into left and right segments, looses valuable storage space since the central tube and the mounting structure protrude through the parent tray.

SUMMARY OF THE INVENTION

An objective of the invention is to provide a frame with a T-shaped structure for a baby carriage, wherein the frame allows a user to freely grip an entire handling member without interference.

Another objective of the invention is to provide a baby carriage allowing for two infant carriers to be attached at the same time.

According to an embodiment of the invention, a frame for a baby carriage comprises two side supporting members, a handling member, a traverse connecting member and a central supporting member. The handling member has opposite ends connected to the two side supporting members, respectively. The traverse connecting member has opposite ends connected to the two side supporting members, respectively and spaced apart from the handling member. The central supporting member is arranged between the two side supporting members so as to form two side-by-side seat areas and terminates at the traverse connecting member so as to form a T-shaped structure.

According to another embodiment of the invention, a baby carriage capable of conveying two infant carriers comprises a frame and two engaging mechanisms. The frame has two side-by-side seat areas for accommodating the two infant carriers, respectively. The two engaging mechanisms are disposed on the frame and used for engaging with the two infant carriers, respectively. The two engaging mechanisms are arranged to the two side-by-side seat areas, respectively and are offset either in a travel direction or in a height direction relative to the frame.

According to another embodiment of the invention, a baby carriage capable of conveying an infant carrier comprises a frame and an engaging mechanism. The engaging mechanism is disposed on the frame and used for engaging with the infant carrier. The engaging mechanism includes an engaging member pivotally connected to the frame. The engaging member has a guiding slot with a first end and a second end opposite to each other, and the frame includes a guiding pin movably inserted in the guiding slot, such that the engaging member is operable for selectively rotating to an active position where the engaging member is allowed to engage with the infant carrier when the guiding pin moves to the first end or rotating to an inactive position where the engaging member is prohibited from engaging with the infant carrier when the guiding pin moves to the second end.

As mentioned in the above, since the traverse connecting member is spaced apart from the handling member and the central supporting member terminates at the traverse connecting member so as to form the T-shaped structure, a user can freely grip the entire handling member without interference accordingly. Furthermore, the baby carriage of the invention is equipped with the two individual engaging mechanisms for engaging with the two infant carriers. Since the two engaging mechanisms are offset either in the travel direction or in the height direction relative to the frame, the two infant carriers can nest closer together without making the frame of the baby carriage overly wide. Moreover, the baby carriage of the invention may be equipped with the single engaging mechanism for engaging with the single infant carrier according to practical applications, wherein the engaging mechanism is capable of rotating between the active position and the inactive position through the cooperation between neither the guiding slot and the sliding slot and the guiding pin.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
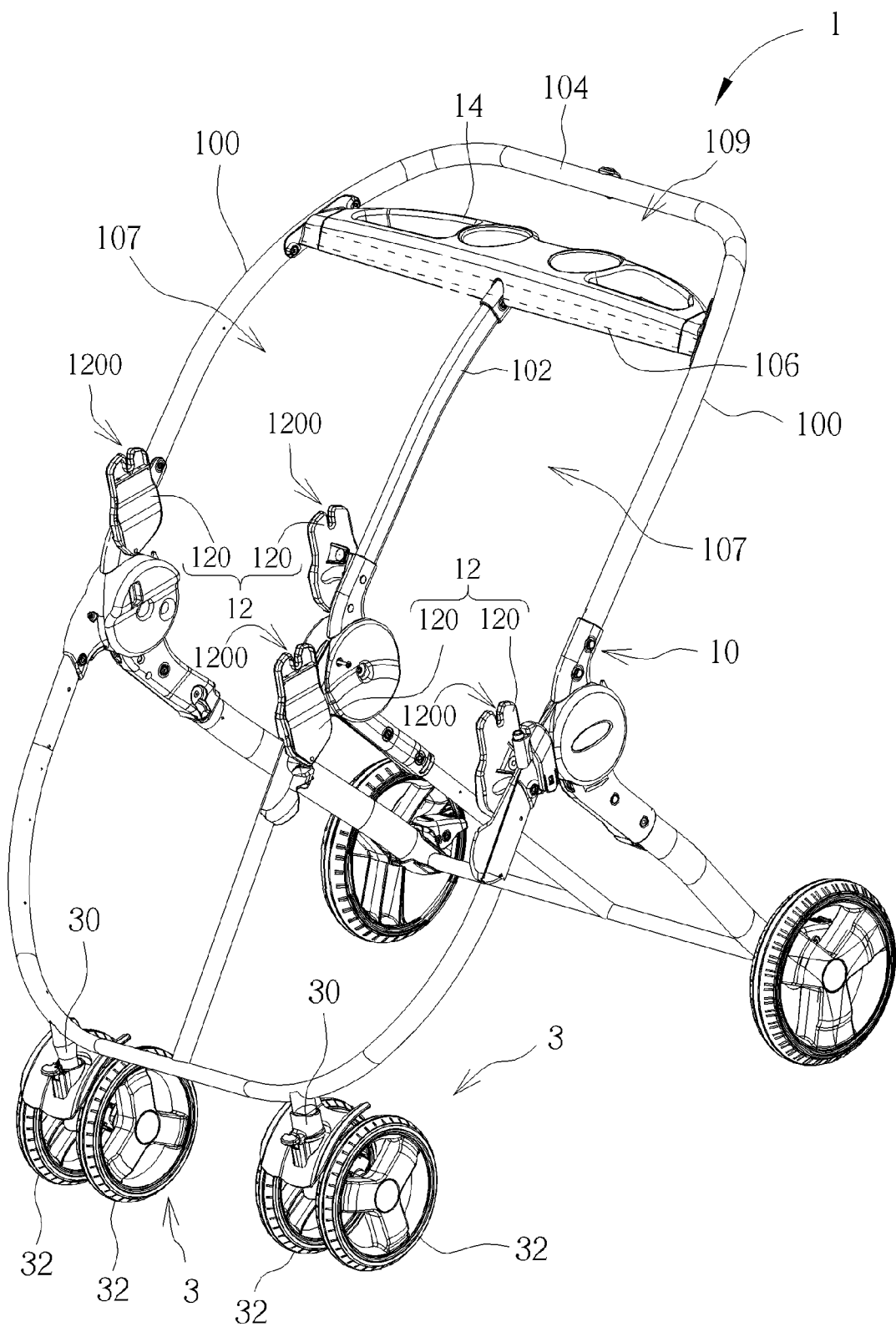
FIG. 1 is a perspective view schematically illustrating a side-by-side duo baby carriage according to a first embodiment of the invention.
Figure 2:
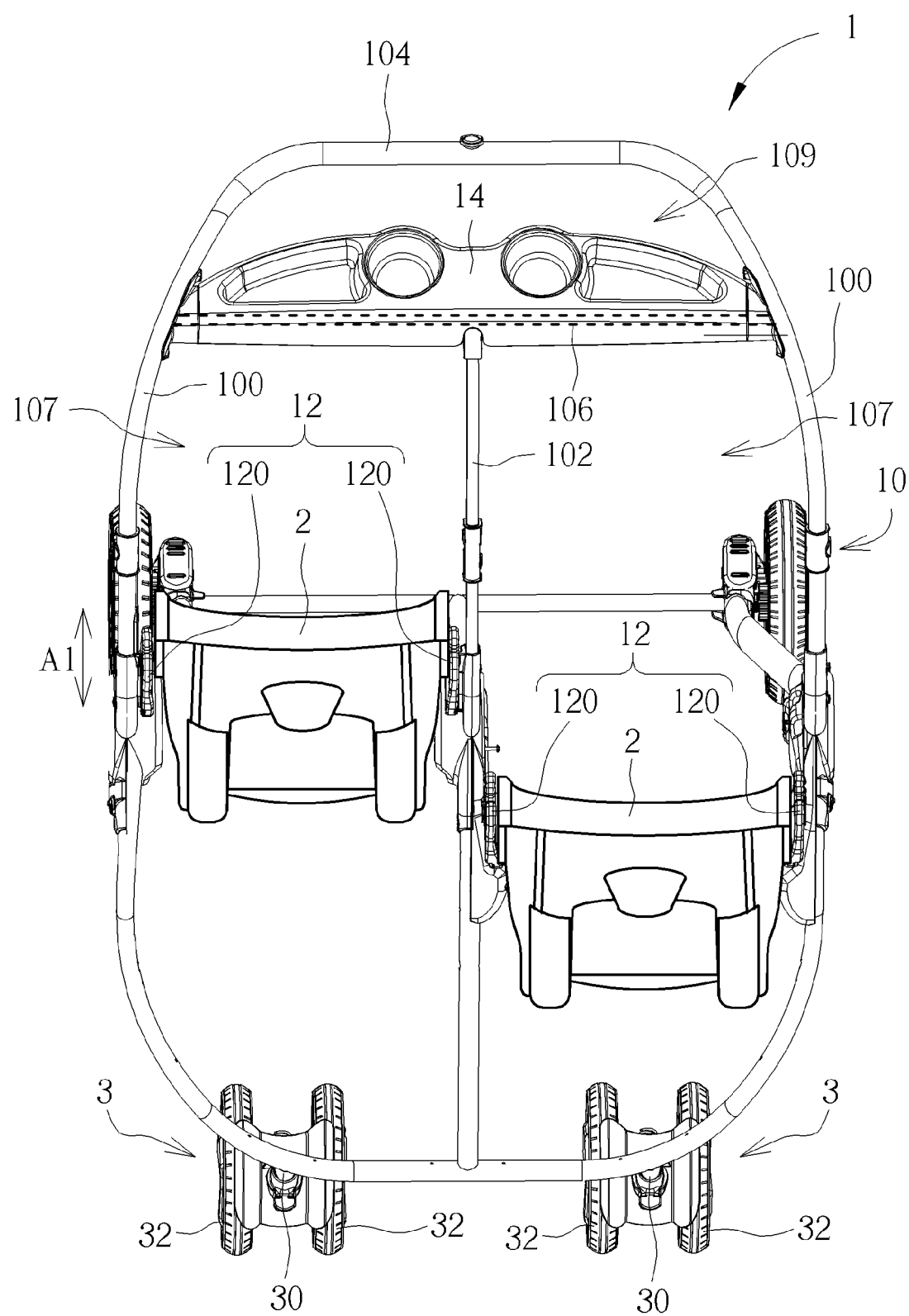
FIG. 2 is a front view schematically illustrating the side-by-side duo baby carriage capable of conveying two infant carriers according to the first embodiment of the invention.
Figure 3:
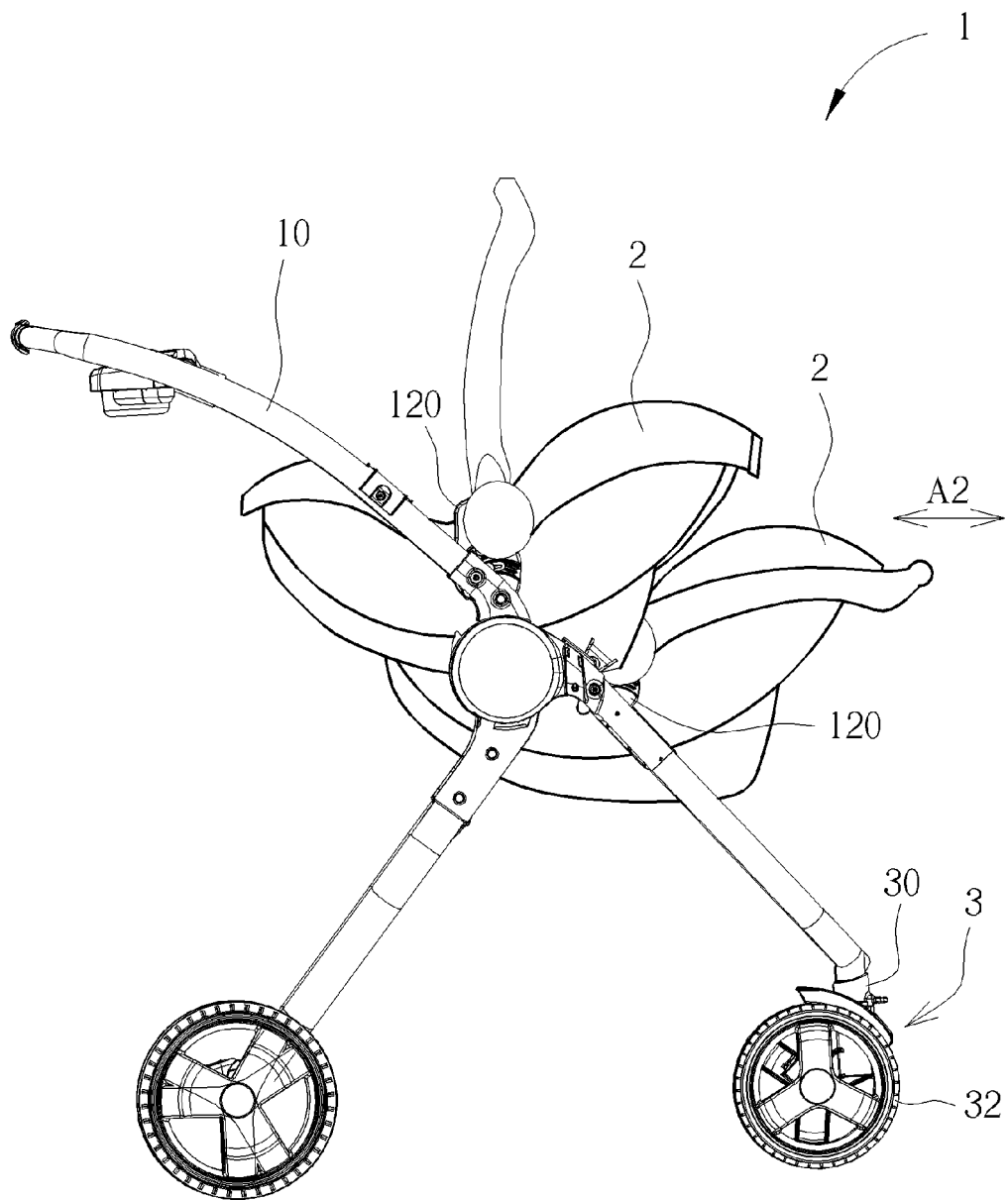
FIG. 3 is a side view schematically illustrating the side-by-side duo baby carriage capable of conveying the two infant carriers according to the first embodiment of the invention.

FIGS. 1 to 11 schematically illustrate a first embodiment of the invention. As shown in FIGS. 1 to 3, a side-by-side duo baby carriage 1 comprises a frame 10 and two engaging mechanisms 12. The side-by-side duo baby carriage 1 may be, but not limited to, a side-by-side duo stroller. The frame 10 comprises two side supporting members 100, a central supporting member 102, a handling member 104 and a traverse connecting member 106. The handling member 104 has opposite ends connected to the two side supporting members 100, respectively. The traverse connecting member 106 has opposite ends connected to the two side supporting members 100, respectively and spaced apart from the handling member 104. The central supporting member 102 is arranged between the two side supporting members 100 so as to form two side-by-side seat areas 107 and terminates at the traverse connecting member 106 so as to form a T-shaped structure, wherein the central supporting member 102 and the two side supporting members 100 are parallel to one another. Furthermore, one of the two side-by-side seat areas 107 is formed between the central supporting member 102 and one of the two side supporting members 100, and the other one of the two side-by-side seat areas 107 is formed between the central supporting member 102 and the other one of the two side supporting members 100.

As shown in FIGS. 1 and 2, the traverse connecting member 106 is horizontally spaced apart from the handling member 104 and vertically connected with the central supporting member 102, such that a space 109 is formed between the handling member 104 and the traverse connecting member 106, and the central supporting member 102 is arranged outside the space 109. In this embodiment, the side-by-side duo baby carriage 1 may further comprise a tray 14 disposed on the traverse connecting member 106 and arranged inside the space 109. Since the traverse connecting member 106 is spaced apart from the handling member 104 and the central supporting member 102 terminates at the traverse connecting member 106 rather than the handling member 104, a user can freely grip the entire handling member 104 and access the tray 14 without interference accordingly. Also, the tray 14 is disposed on the traverse connecting member 106 rather than the handling member 104, and the tray 14 is not divided by the central supporting member 102, so the storage capacity of the tray 14 is maximized.

The two engaging mechanisms 12 are disposed on the frame 10 and used for engaging with two infant carriers 2 (e.g. infant car seats or nappers), respectively. The two engaging mechanisms 12 are arranged to the two side-by-side seat areas 107, respectively and are offset either in a travel direction A2 (as shown in FIG. 3) or in a height direction A1 (as shown in FIG. 2) relative to the frame 10, such that the two full-size infant carriers 2 can be securely attached onto the frame 10 of the side-by-side duo baby carriage 1 at the same time. As shown in FIGS. 2 and 3, when the two infant carriers 2 are attached on the two engaging mechanisms 12 respectively, the two infant carriers 2 are offset vertically relative to the floor (i.e. in the height direction A1) and front to back (i.e. in the travel direction A2) on the frame 10. Accordingly, the invention allows the two infant carriers 2 to nest closer together without making the frame 10 of the side-by-side duo baby carriage 1 overly wide.

Figure 4:
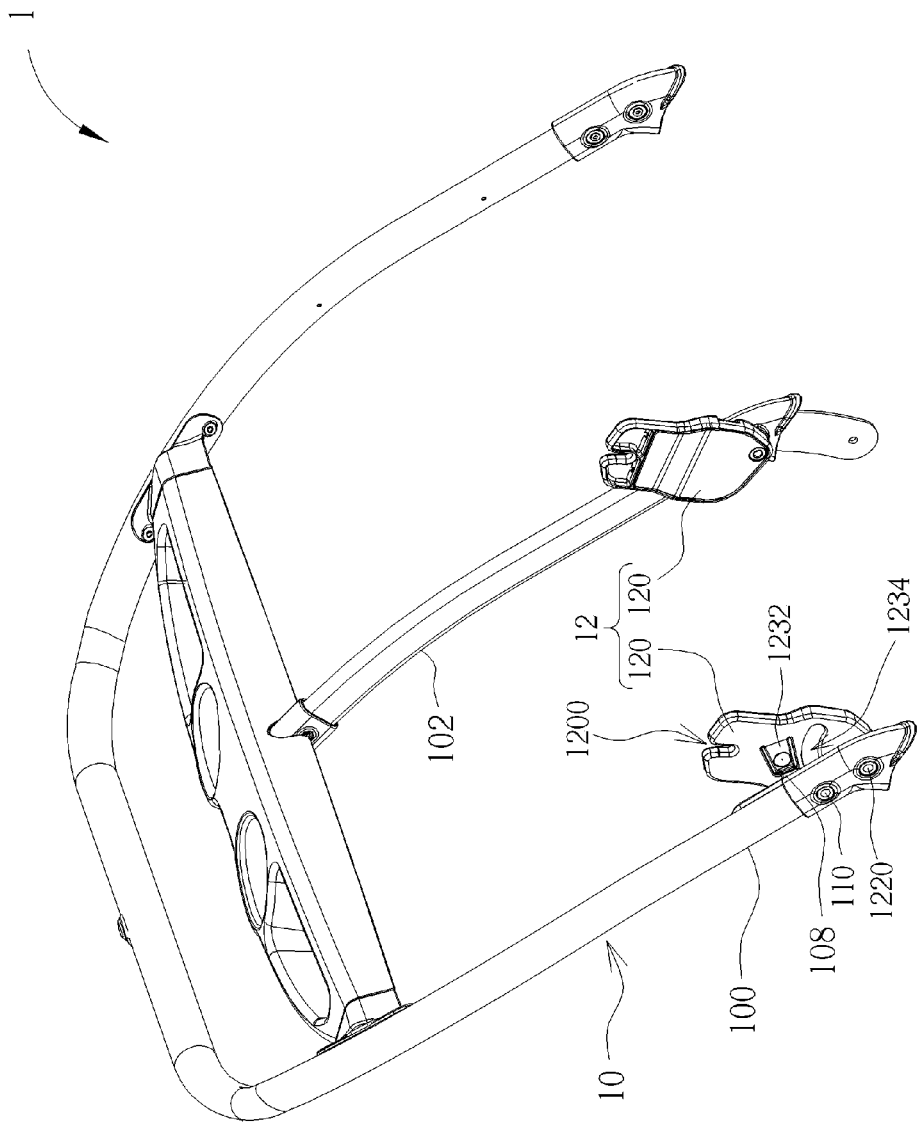
FIG. 4 is a perspective view schematically illustrating an upper part of the side-by-side duo baby carriage equipped with two engaging members pivotally disposed on a frame and each located at an active position according to the first embodiment of the invention.
Figure 5:
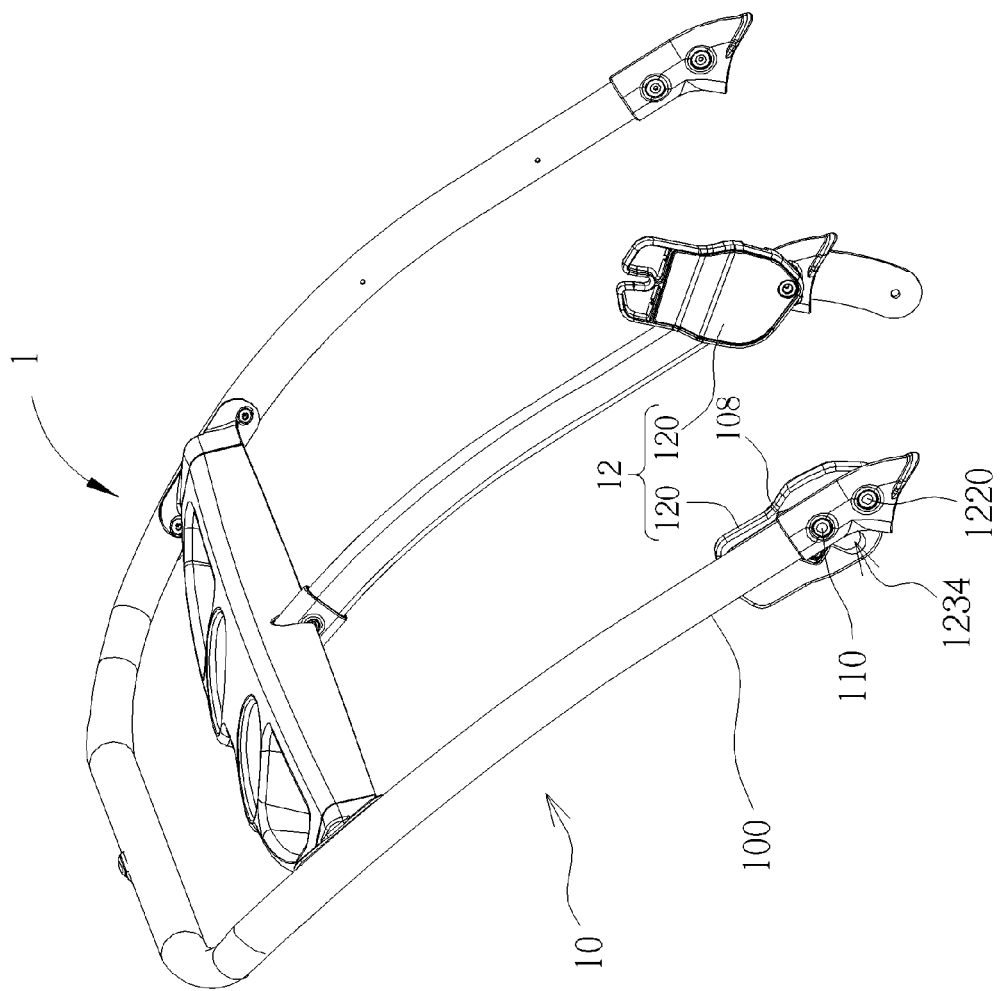
FIG. 5 is a perspective view schematically illustrating the upper part of the baby carriage equipped with the two engaging members pivotally disposed on the frame and located at the active position and an inactive position, respectively according to the first embodiment of the invention.
Figure 6:
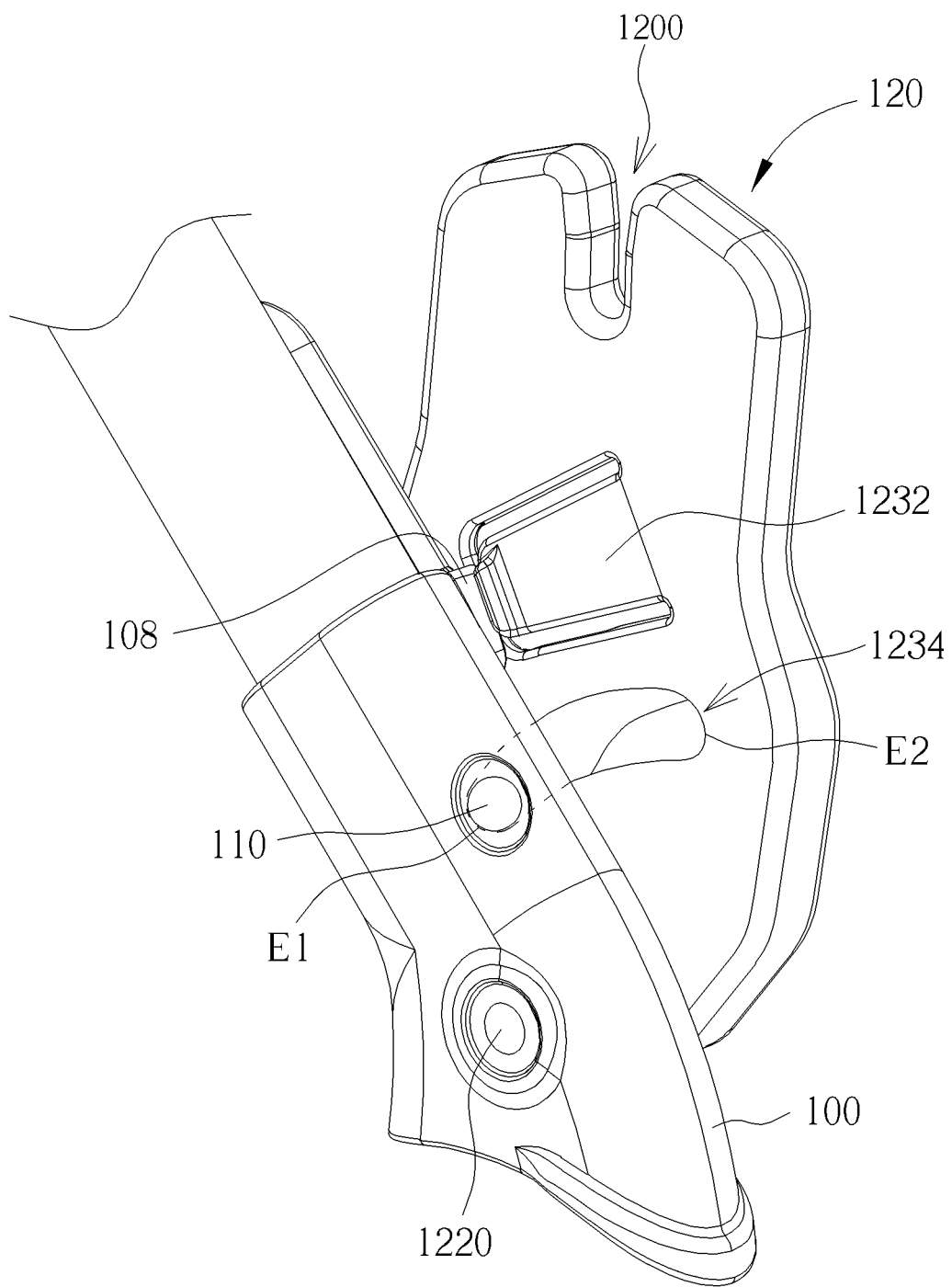
FIG. 6 is an enlarged view schematically illustrating the engaging member disposed on the frame and maintained at the active position according to the first embodiment of the invention.
Figure 7:
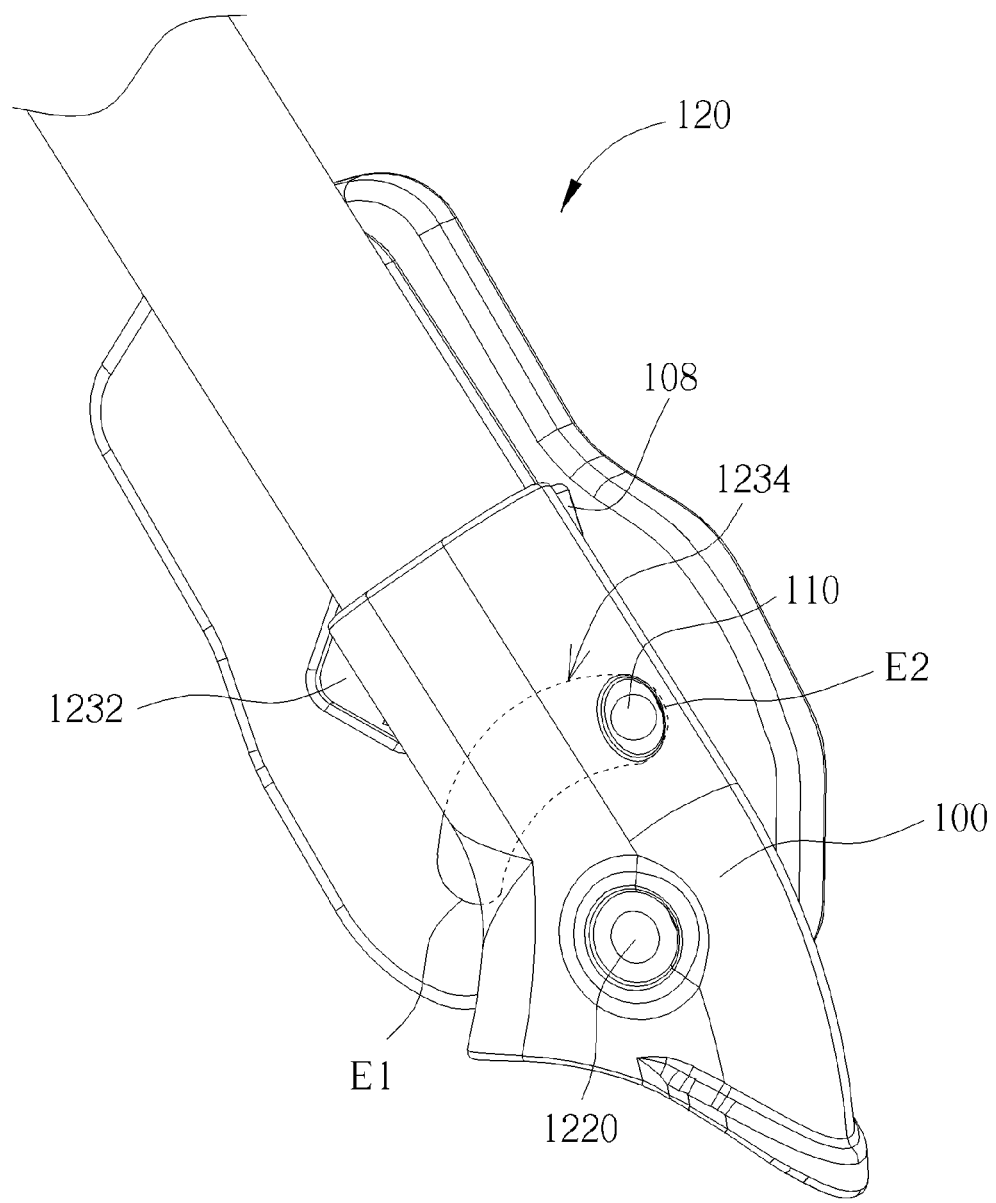
FIG. 7 is an enlarged view schematically illustrating the engaging member disposed on the frame and rotating to the inactive position according to the first embodiment of the invention.
Figure 8:
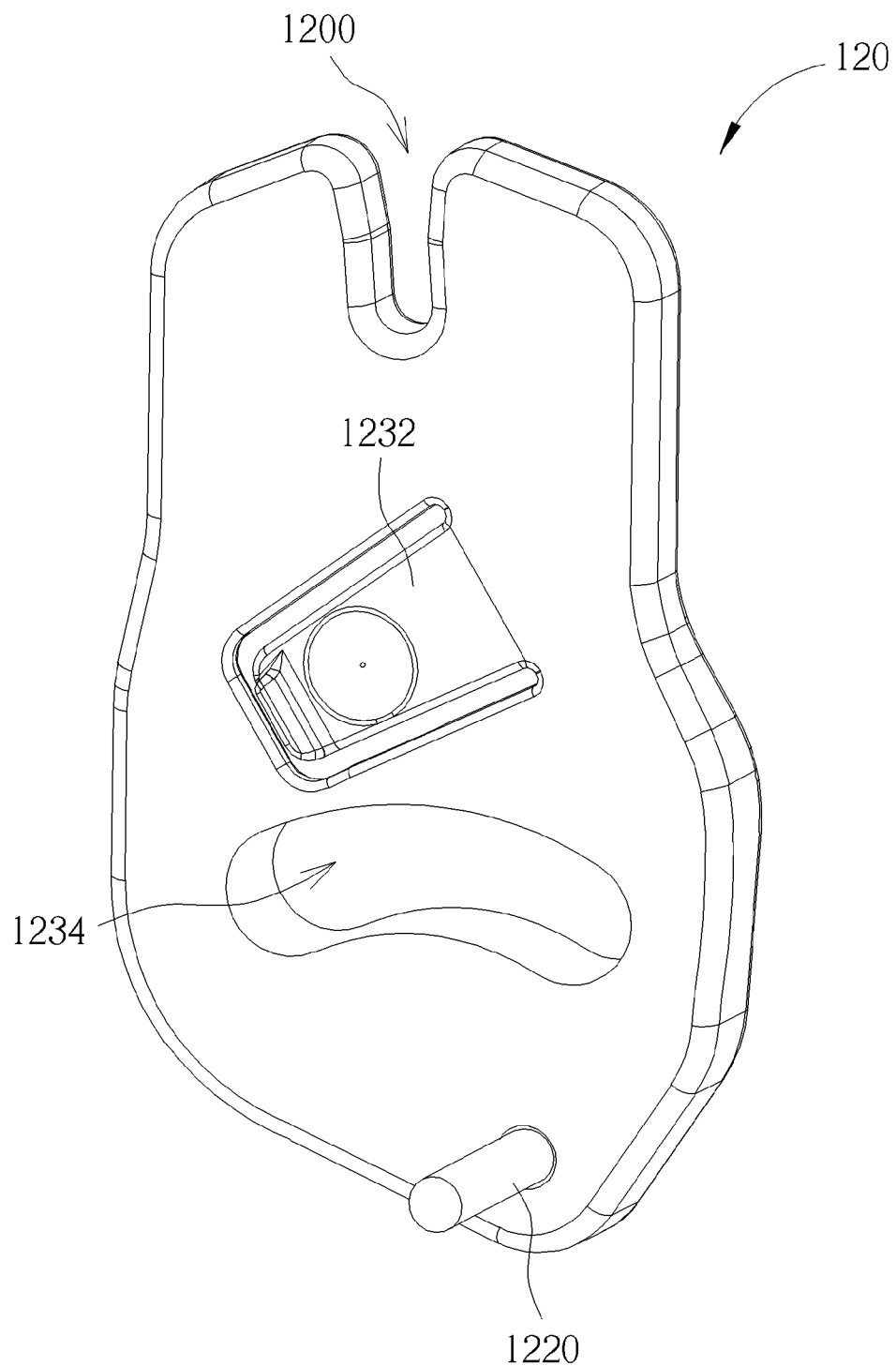
FIG. 8 is a front view schematically illustrating the engaging member according to the first embodiment of the invention.

Referring to FIGS. 4 to 11, in this embodiment, each of the engaging mechanisms 12 comprises two engaging members 120 pivotally connected to the frame 10, wherein the two engaging members 120 are pivotally connected to the side supporting member 100 and the central supporting member 102, respectively. In this embodiment, every two engaging members 120 of each engaging mechanisms 12 are located at an identical height relative to the frame 10. Furthermore, each of the engaging members 120 includes an engaging portion 1200 for detachably engaging with the infant carrier 2. The engaging member 120 is operable for selectively rotating to an active position (as shown in FIGS. 4 and 6) where the engaging member 120 is allowed to engage with the infant carrier 2 or rotating to an inactive position (as shown in FIGS. 5 and 7) where the engaging member 120 is prohibited from engaging with the infant carrier 2. The engaging member 120 is exposed relative to the frame 10 when locating at the active position, such that the engaging portion 1200 is located above the frame 10 at the active position. At this time, the engaging portion 1200 of the engaging member 120 is allowed to engage with the infant carrier 2. On the other hand, the engaging member 120 is hidden relative to the frame 10 when locating at the inactive position, such that the engaging portion 1200 is located under the frame 10 at the inactive position. At this time, the engaging portion 1200 of the engaging member 120 is prohibited from engaging with the infant carrier 2.

As shown in FIGS. 6 to 11, the engaging member 120 is pivotally connected to the side supporting member 100 of the frame 10 through an axle 1220. The engaging member 120 has a guiding slot 1234, and the side supporting member 100 of the frame 10 includes a guiding pin 110 movably inserted in the guiding slot 1234, such that the engaging member 120 is operable for selectively rotating to the active position (as shown in FIG. 6) where the engaging member 120 is allowed to engage with the infant carrier 2 when the guiding pin 110 moves to a first end E1 of the guiding slot 1234 or rotating to the inactive position (as shown in FIG. 7) where the engaging member 120 is prohibited from engaging with the infant carrier 2 when the guiding pin 110 moves to a second end E2 of the guiding slot 1234 opposite to the first end E1. In other words, through the cooperation between the guiding slot 1234 and the guiding pin 110, the engaging member 120 is limited between the active position shown in FIG. 6 and the inactive position shown in FIG. 7.

Furthermore, the side supporting member 100 (or the central supporting member 102) of the frame 10 may further include a retaining portion 108 and the engaging member 120 may include a flexible portion 1232 biased towards the retaining portion 108. When the flexible portion 1232 and the first end E1 are interfered with the retaining portion 108 and the guiding pin 110, respectively, the engaging member 120 is maintained at the active position shown in FIG. 6. Substantially, in response to the engaging member 120 rotating to the active position, the first end E1 of the guiding slot 1234 is interfered with the guiding pin 110, and the flexible portion 1232 is biased to contact against the retaining portion 108. When the flexible portion 1232 is pressed to prevent from interfering with the retaining portion 108, the engaging member 120 is capable of rotating to the inactive position shown in FIG. 7. Substantially, in response to the engaging member 120 rotating to the inactive position, the second end E2 of the guiding slot 1234 is interfered with the guiding pin, and the flexible portion 1232 is pressed so as not to interfere the rotation of the engaging member 120.

The engaging members 120 of the invention can deploy to the active position when they are needed and also retract to the inactive position when they are not in use. The aforesaid manner makes it very convenient for the child because the engaging members 120 are not in the way when a toddler seat of the side-by-side duo baby carriage 1 is used. It is also convenient for the caregiver because the engaging members 120 are attached to the frame 10 of the side-by-side duo baby carriage 1 and cannot be lost when they are not in use.

Figure 9:
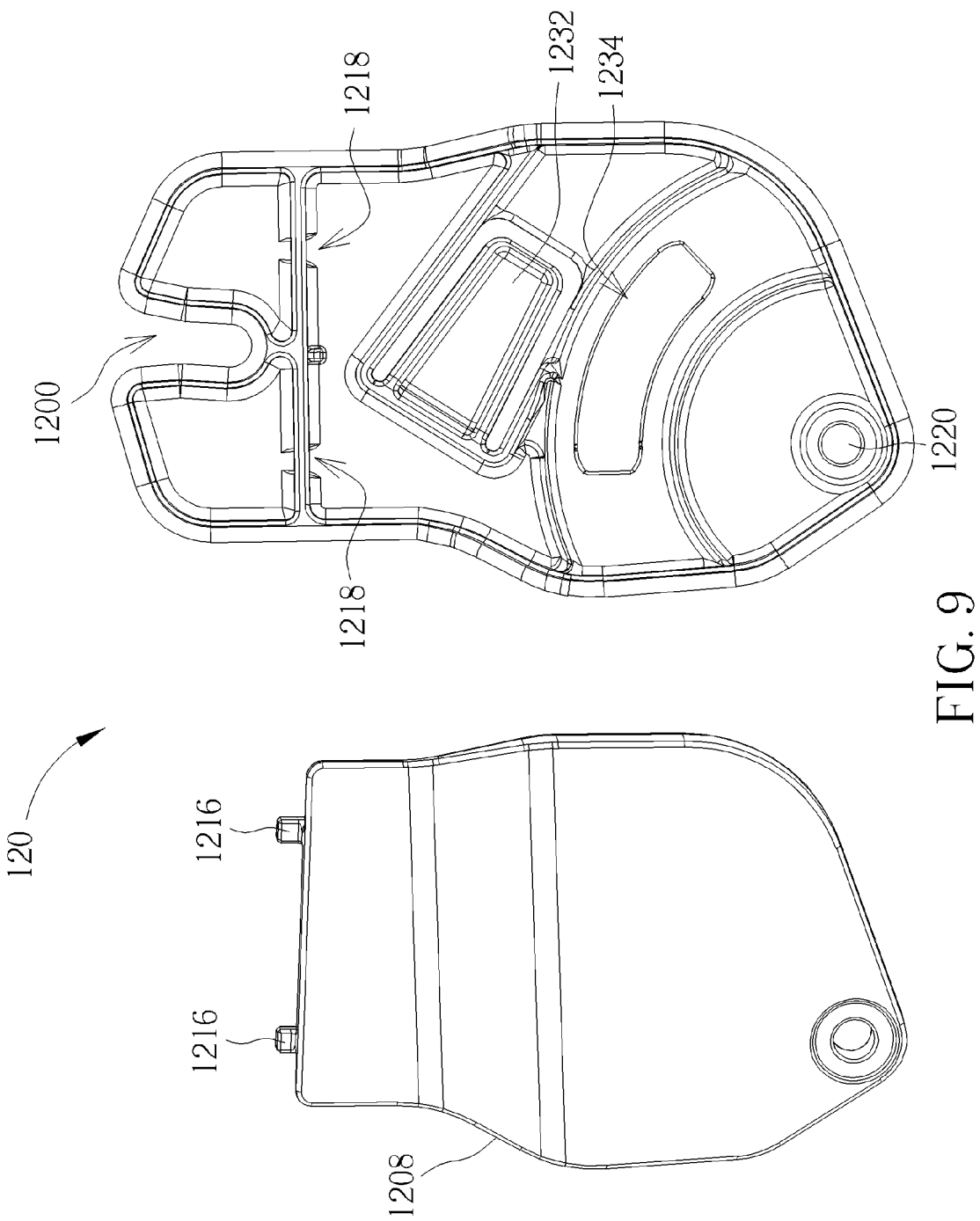
FIG. 9 is a rear view schematically illustrating a disassembly of a rear cap and the engaging member according to the first embodiment of the invention.
Figure 10:
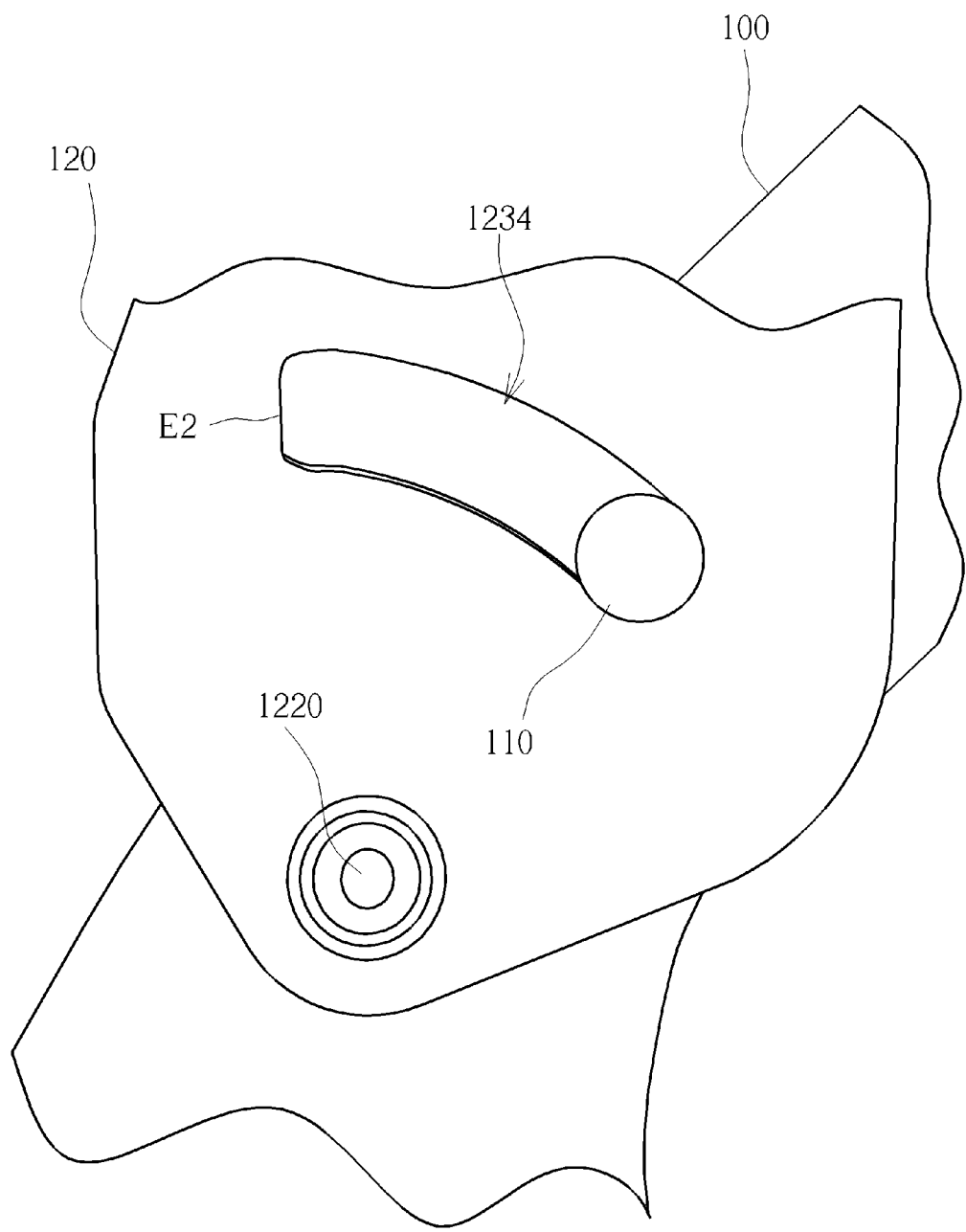
FIG. 10 is a rear view schematically illustrating the engaging member located at the active position according to the first embodiment of the invention.
Figure 11:
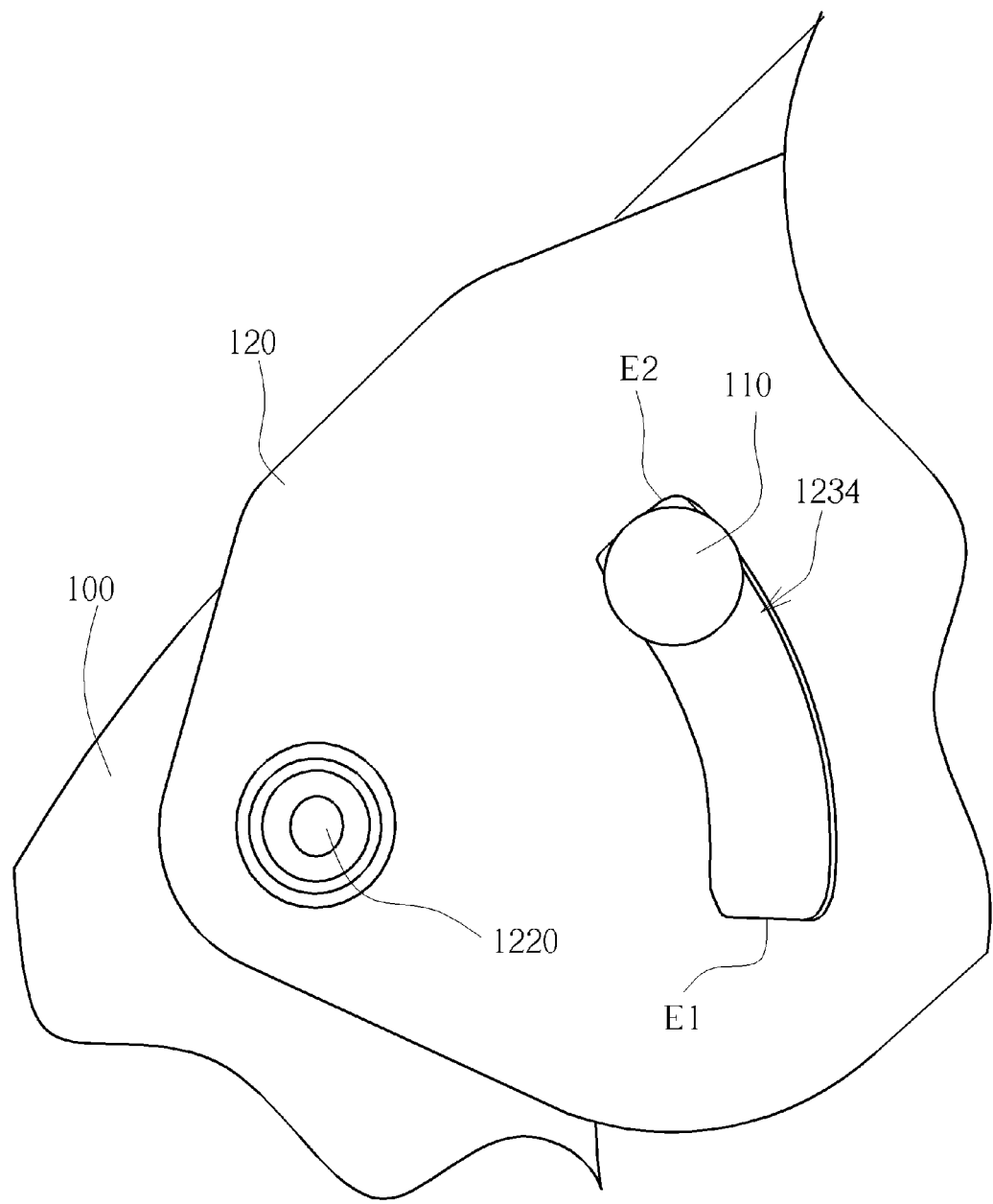
FIG. 11 is a rear view schematically illustrating the engaging member located at the inactive position according to the first embodiment of the invention.
Figure 12:
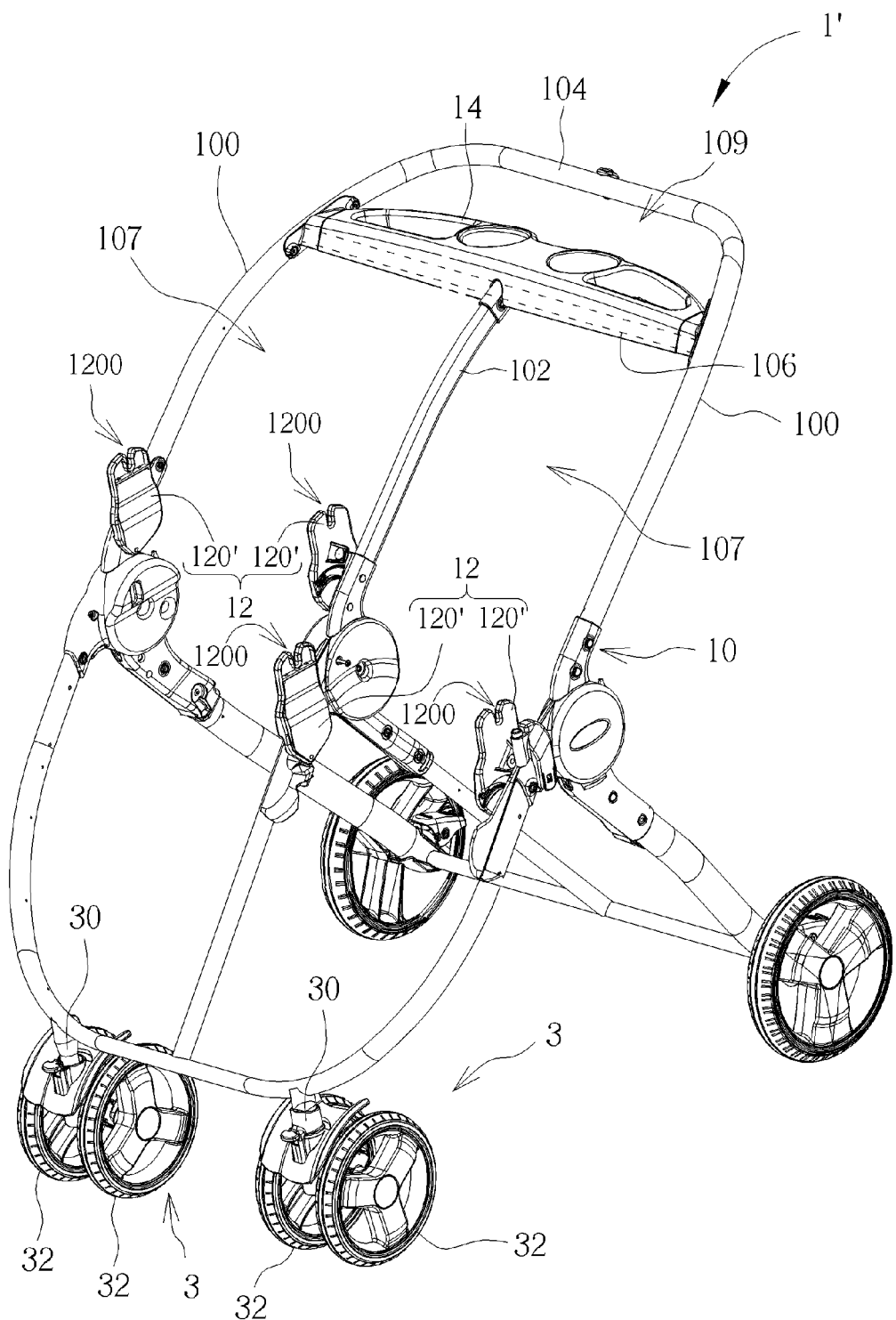
FIG. 12 is a perspective view schematically illustrating the side-by-side duo baby carriage according to a second embodiment of the invention.
Figure 13:
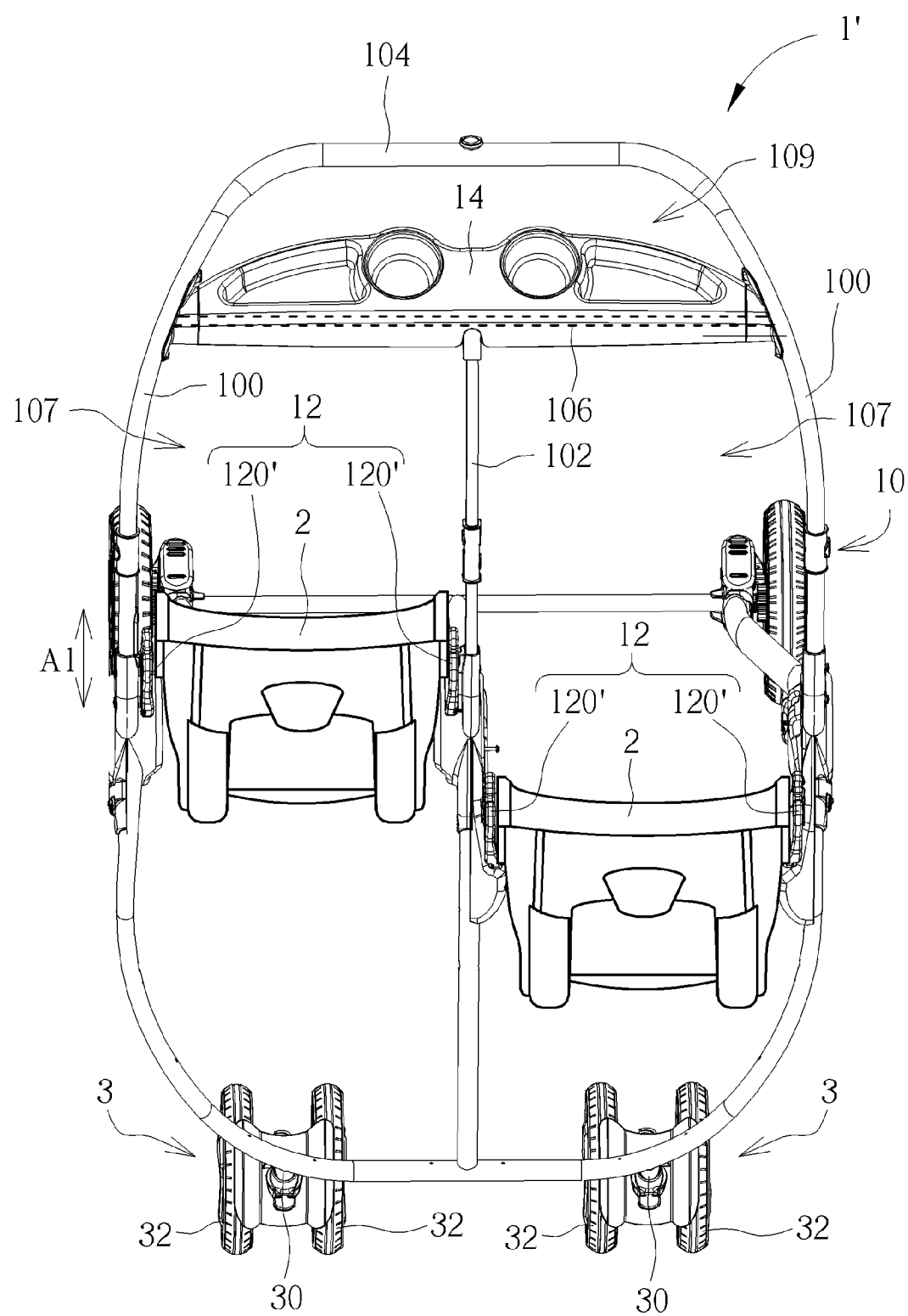
FIG. 13 is a front view schematically illustrating the side-by-side duo baby carriage capable of conveying the two infant carriers according to the second embodiment of the invention.
Figure 14:
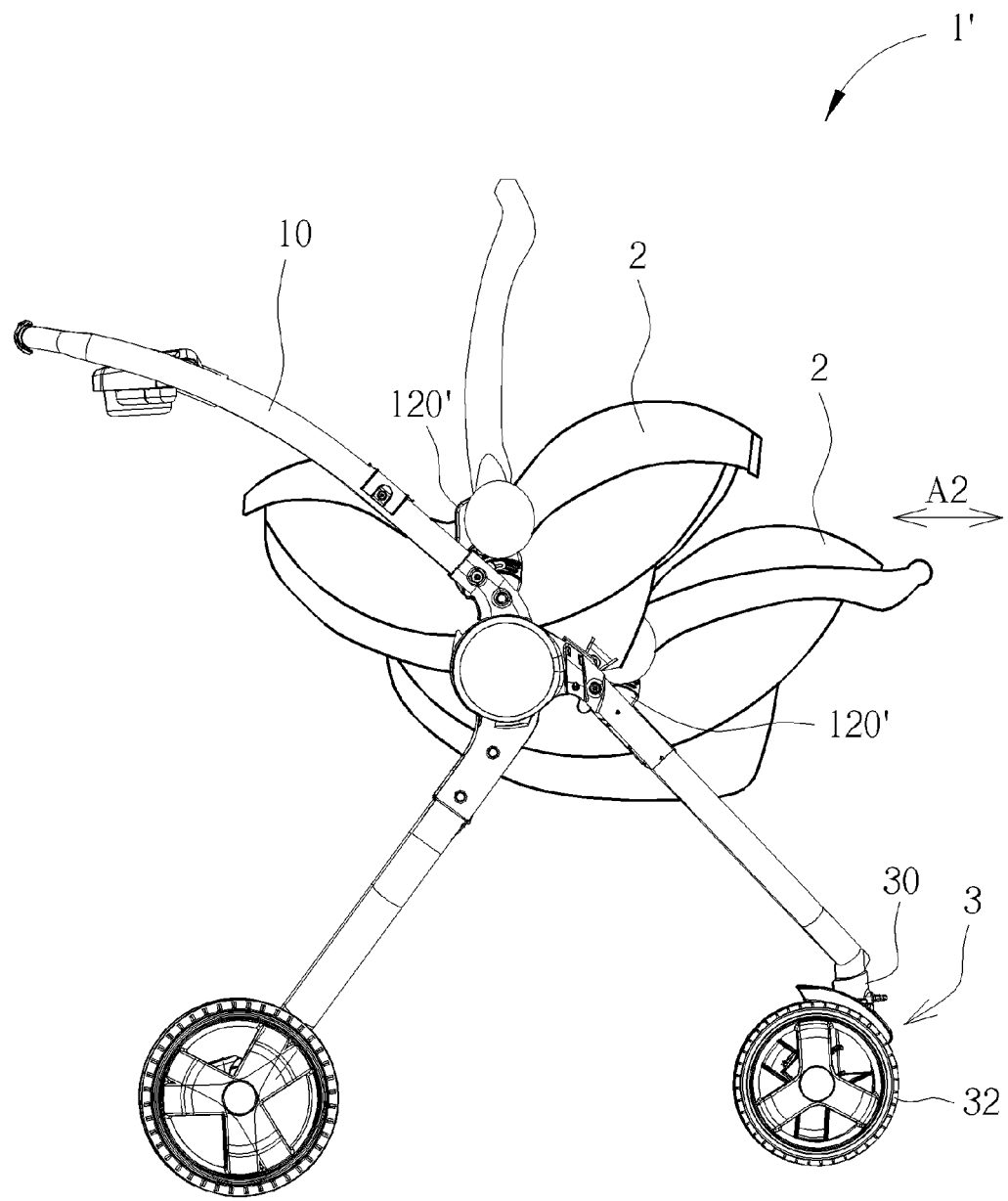
FIG. 14 is a side view schematically illustrating the side-by-side duo baby carriage capable of conveying the two infant carriers according to the second embodiment of the invention.

The engaging mechanism 120 further includes a rear cap 1208 attached to a side of the engaging member 120 opposite to the frame 10 so as to cover the guiding slot 1234. As shown in FIG. 9, the rear cap 1208 has two tabs 1216 on its top surface that are accepted into corresponding holes 1218 in the engaging member 120, such that the rear cap 1208 is attached to a side of the engaging member 120. Furthermore, the other end of the rear cap 1208 may be attached by the axle 1220 that also goes through the side supporting member 100 (or the central tube 102) and the engaging member 120. Accordingly, the engaging member 120 can pivot around the axle 1220 with respect to the frame 10. It should be noted that the rear cap 1208 could also be attached in other ways and could also be smaller to save material cost.

FIGS. 12 to 24 schematically illustrate a second embodiment of the invention. It should be noted that the same elements in FIGS. 12-24 and FIGS. 1-11 are represented by the same numerals, so the repeated explanation will not be depicted herein again.

Figure 15:
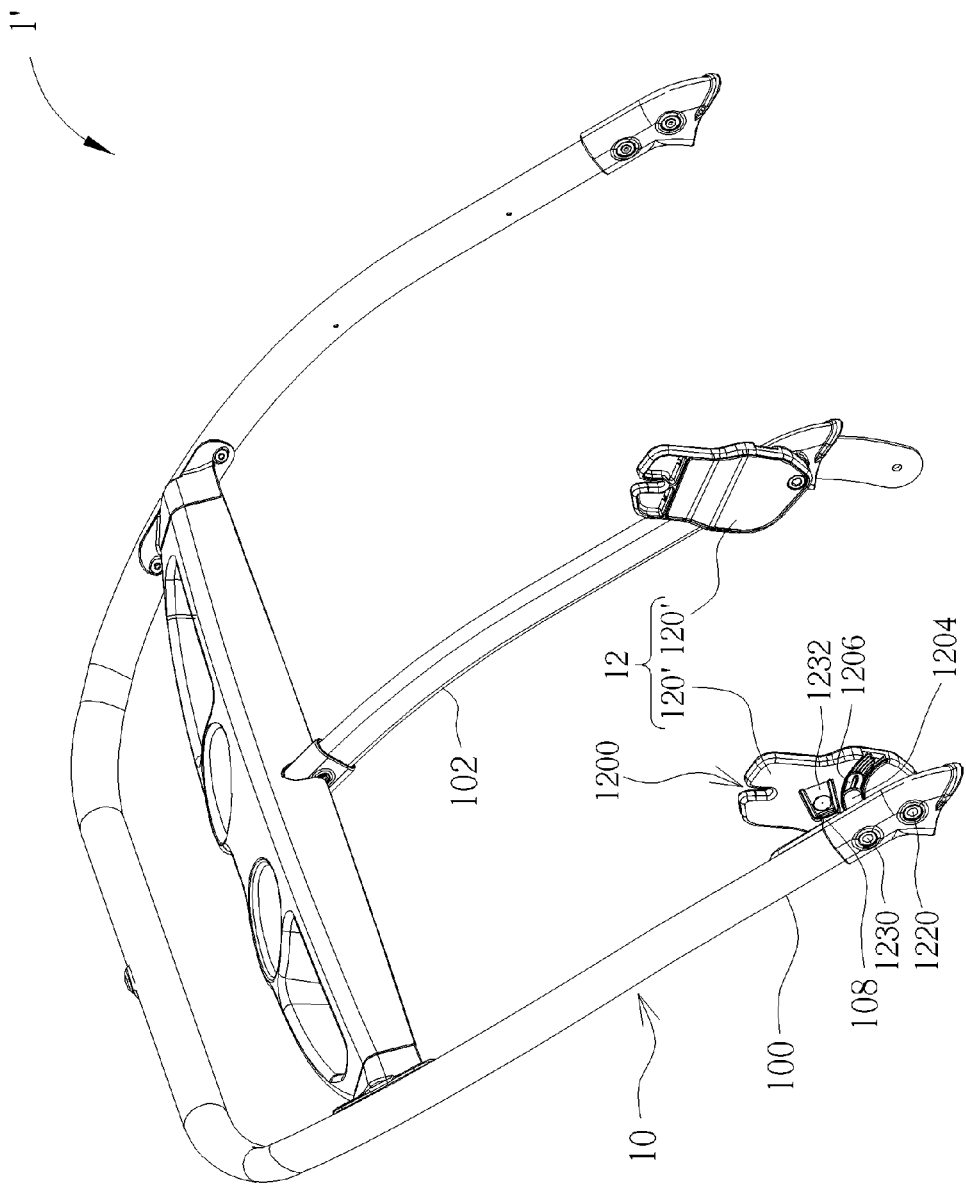
FIG. 15 is a perspective view schematically illustrating the upper part of the side-by-side duo baby carriage equipped with the two engaging members pivotally disposed on the frame and each located at the active position according to the second embodiment of the invention.
Figure 16:
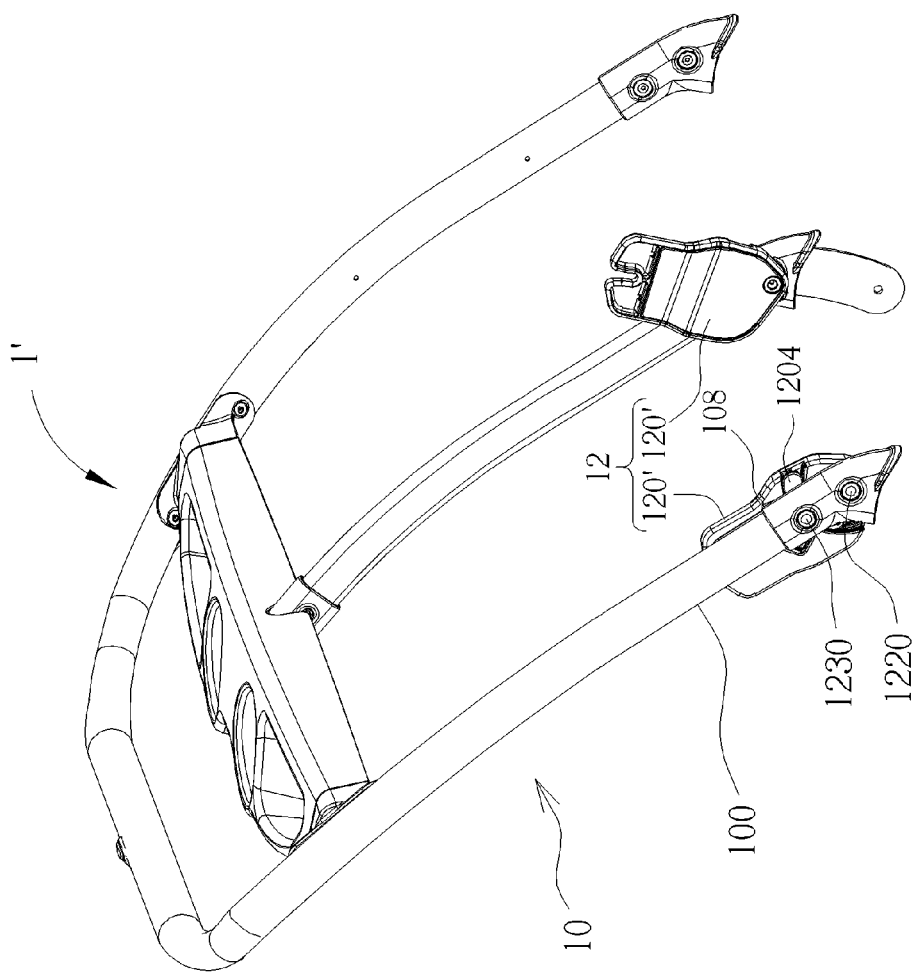
FIG. 16 is a perspective view schematically illustrating an upper part of the baby carriage equipped with the two engaging members pivotally disposed on the frame and located at the active position and the inactive position, respectively according to the second embodiment of the invention.
Figure 23:
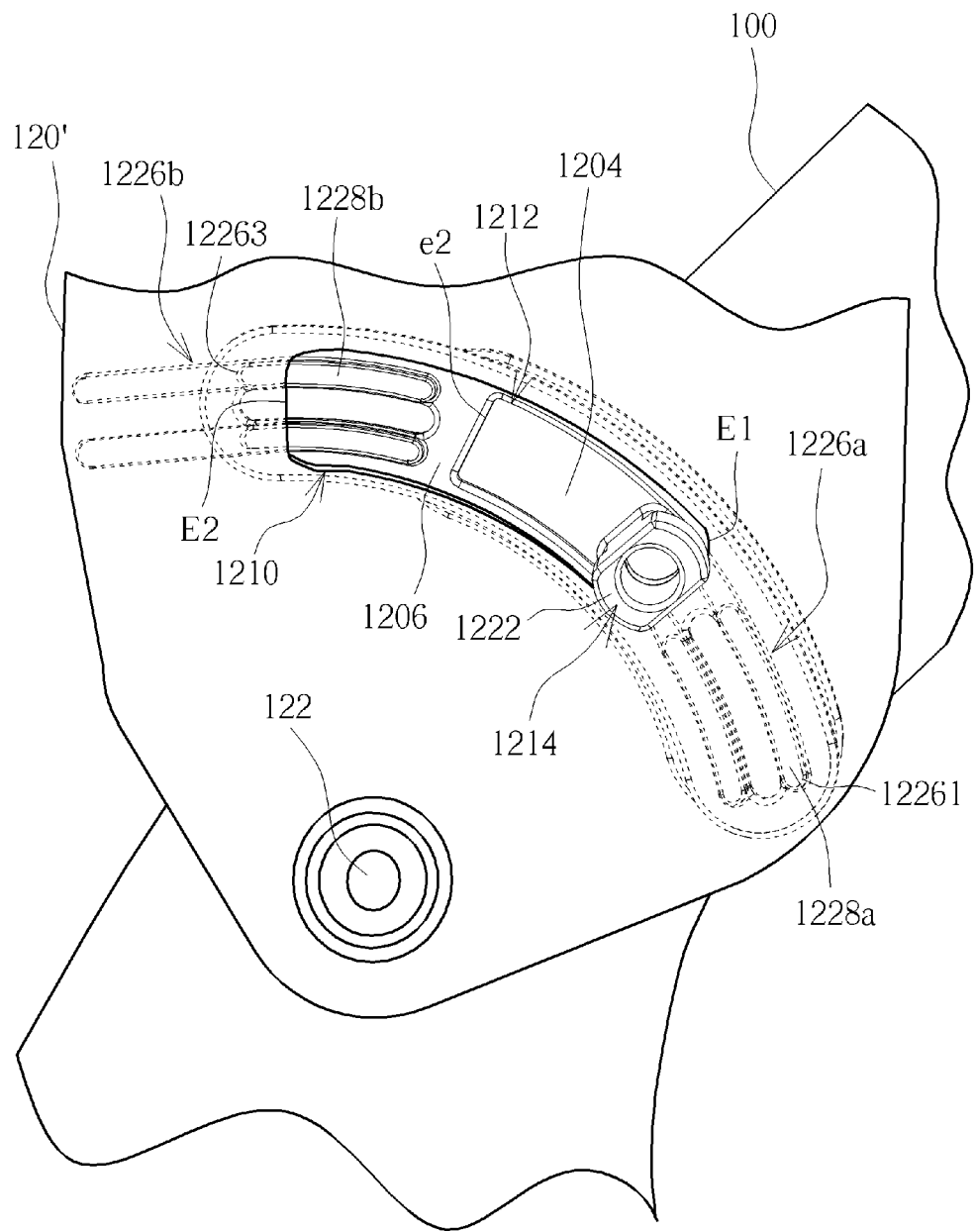
FIG. 23 is a rear view schematically illustrating the engaging member located at the active position, the inner guide member covering a guiding slot and the outer guide member covering a sliding slot according to the second embodiment of the invention.
Figure 24:
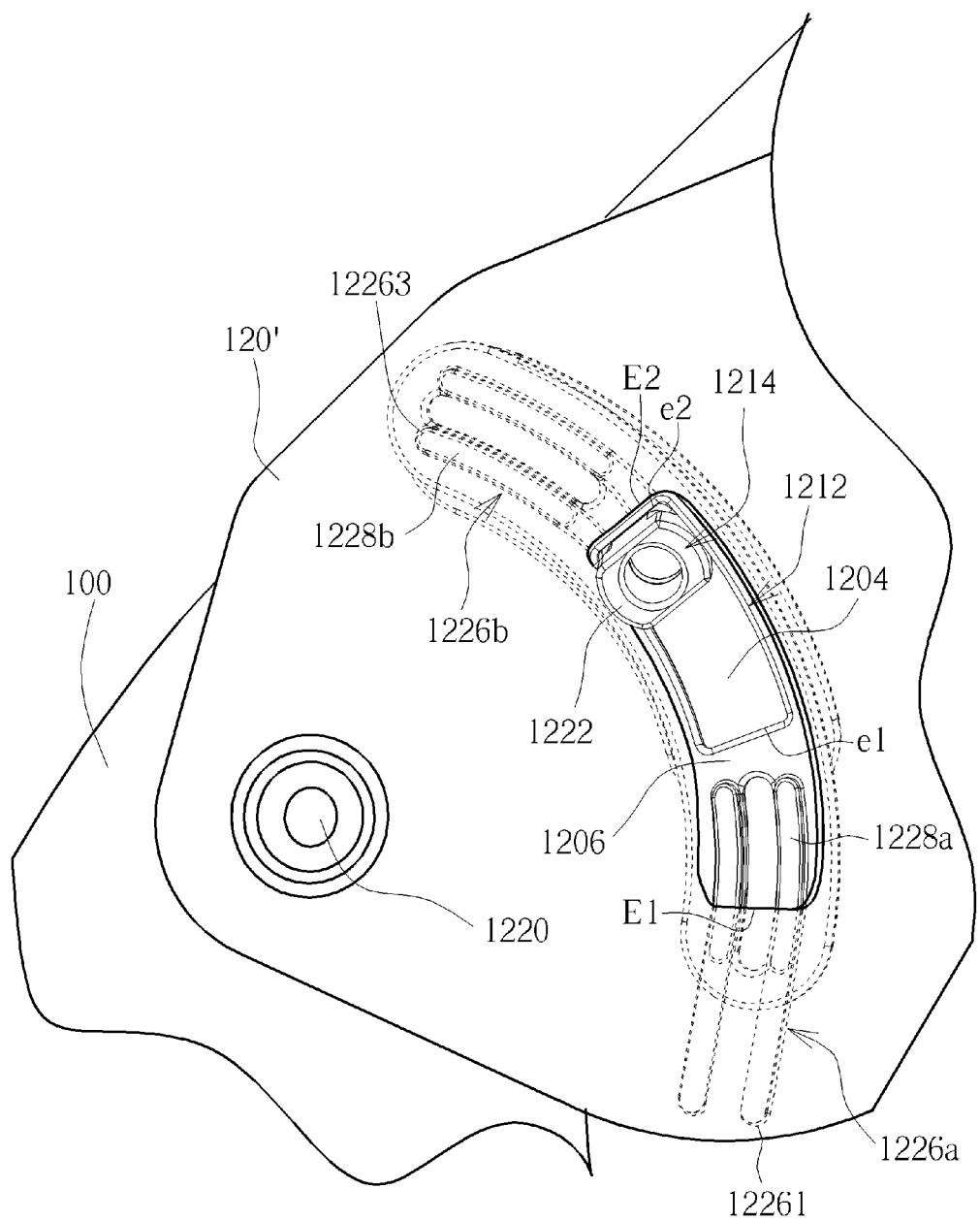
FIG. 24 is a rear view schematically illustrating the engaging member located at the inactive position, the inner guide member covering the guiding slot and the outer guide member covering the sliding slot according to the second embodiment of the invention.

As shown in FIGS. 12 to 21, each of the two engaging mechanisms 12 comprises the engaging member 120', an outer guide member 1204, an inner guide member 1206 and the rear cap 1208. The engaging member 120' has the guiding slot 1210, the inner guide member 1206 has a sliding slot 1212 communicated with the guiding slot 1210, and the frame 10 includes the guiding pin 1214 movably inserted in the sliding slot 1212 and the guiding slot 1210, such that the engaging member 120' is operable for selectively rotating to the active position (as shown in FIGS. 15 and 23) where the engaging member 120' is allowed to engage with the infant carrier 2 when the guiding pin 1214 moves to the first end E1 of the guiding slot 1210 or rotating to the inactive position (as shown in FIGS. 16 and 24) where the engaging member 120' is prohibited from engaging with the infant carrier 2 when the guiding pin 1214 moves to the second end E2 of the guiding slot 1210 opposite to the first end E1.

Figure 17:
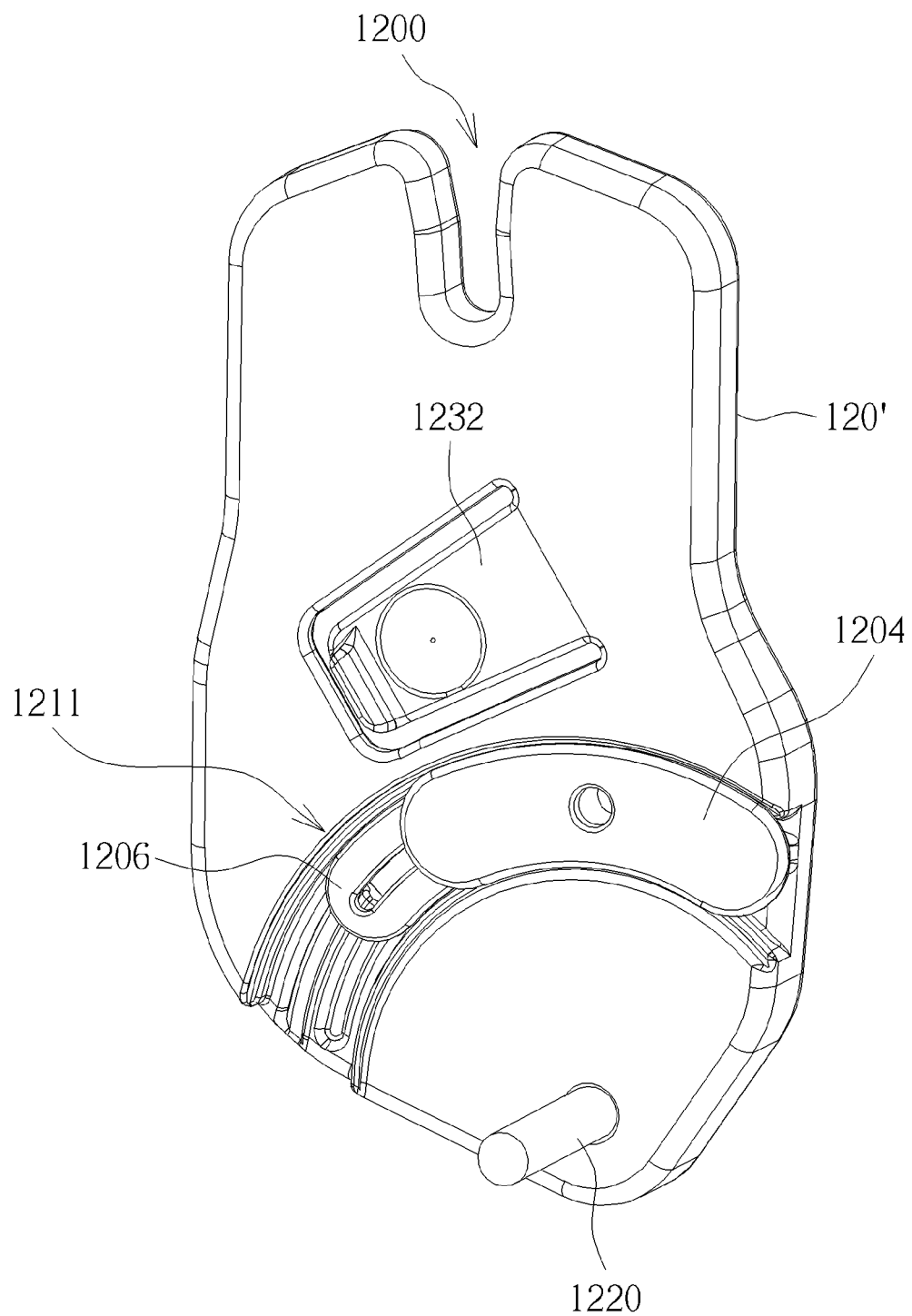
FIG. 17 is a front view schematically illustrating an assembly of the engaging member, an inner guide member and an outer guide member according to the second embodiment of the invention.
Figure 19:
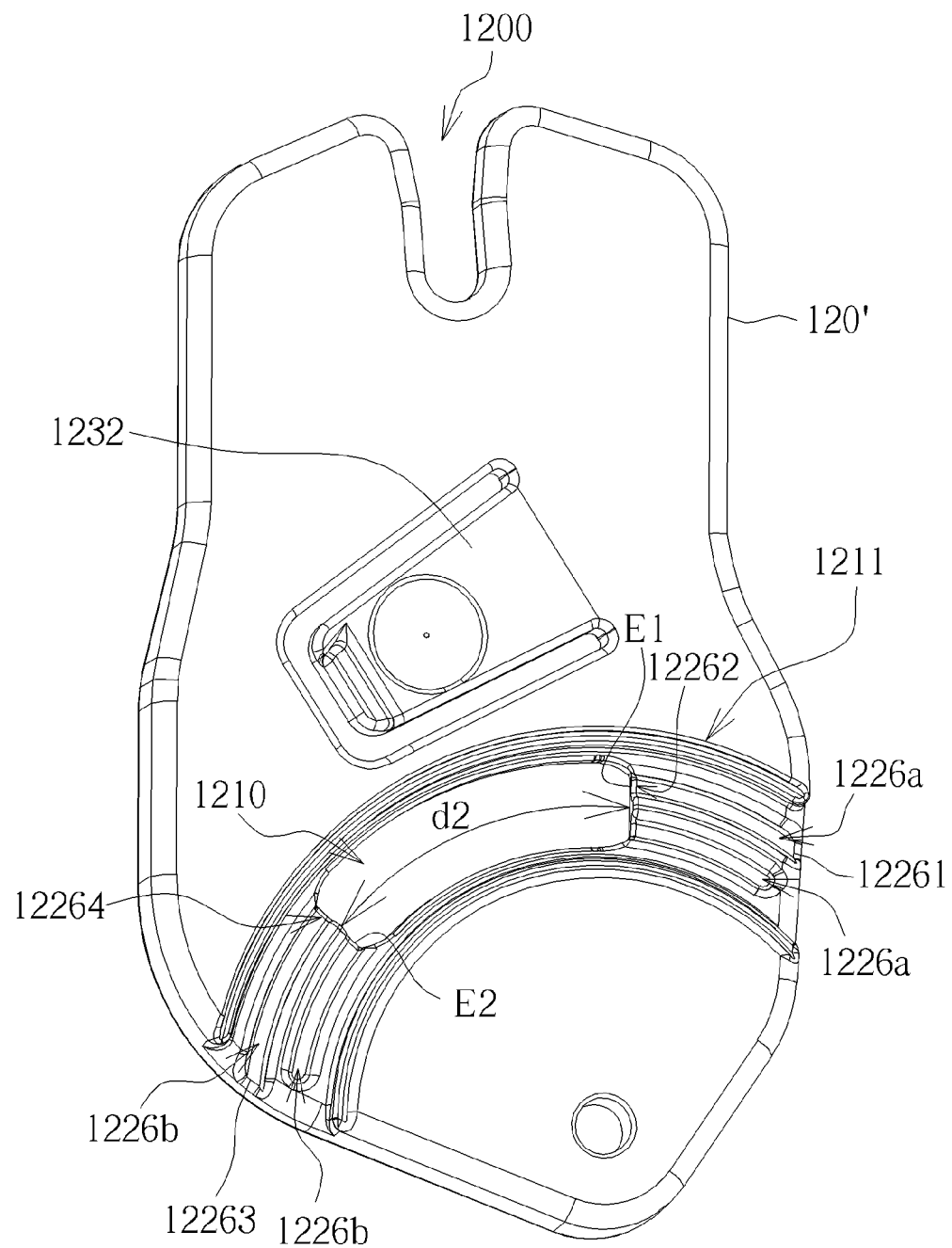
FIG. 19 is a front view schematically illustrating the engaging member according to the second embodiment of the invention.

In this embodiment, the engaging member 120' further has a shallow groove 1211 communicated with the guiding slot 1210, and the inner guide member 1206 is movably inserted in the shallow groove 1211 (as shown in FIGS. 17 and 19), such that the inner guide member 1206 is sandwiched in between the frame 10 and the engaging member 120', is movably disposed along the guiding pin 1214 and covers the guiding slot 1210.

Figure 20:
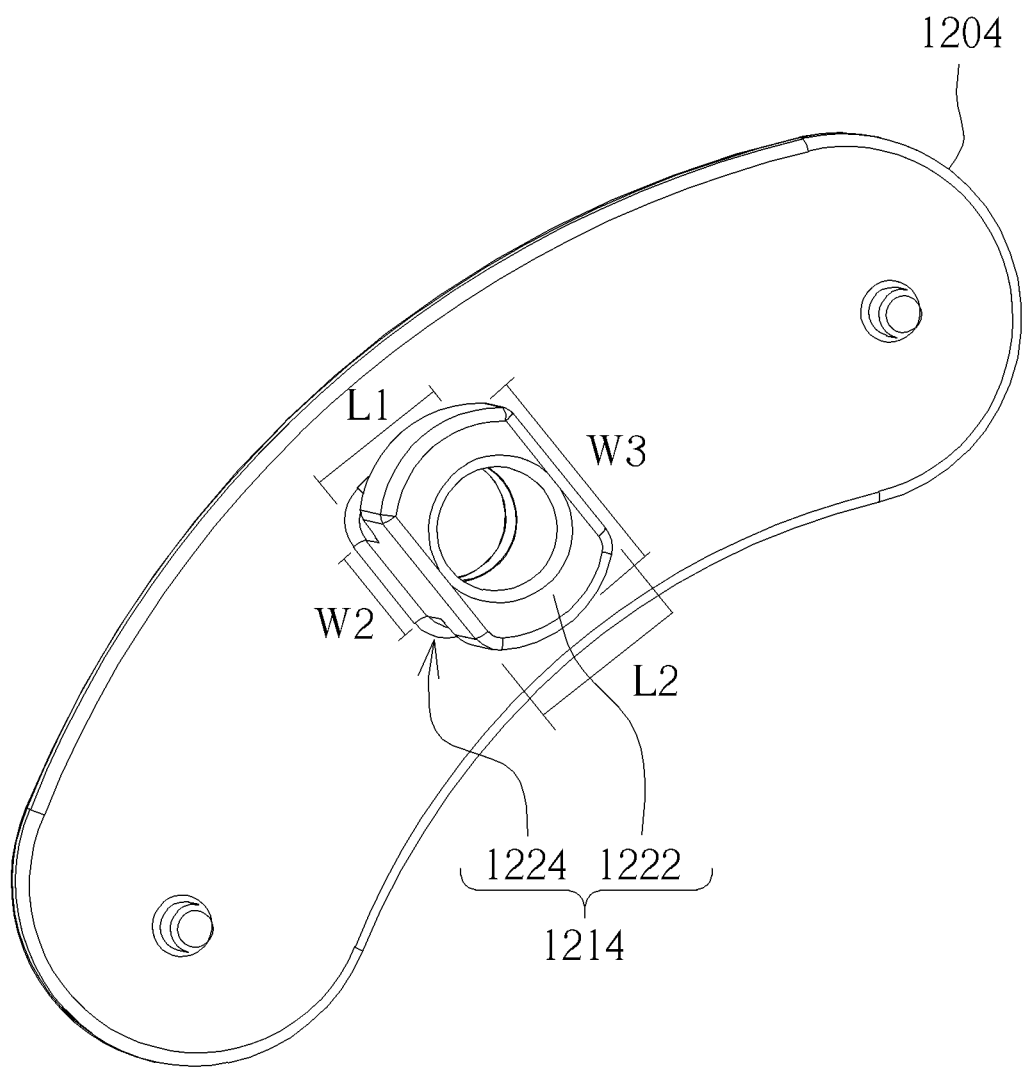
FIG. 20 is a rear view schematically illustrating the outer guide member according to the second embodiment of the invention.
Figure 21:
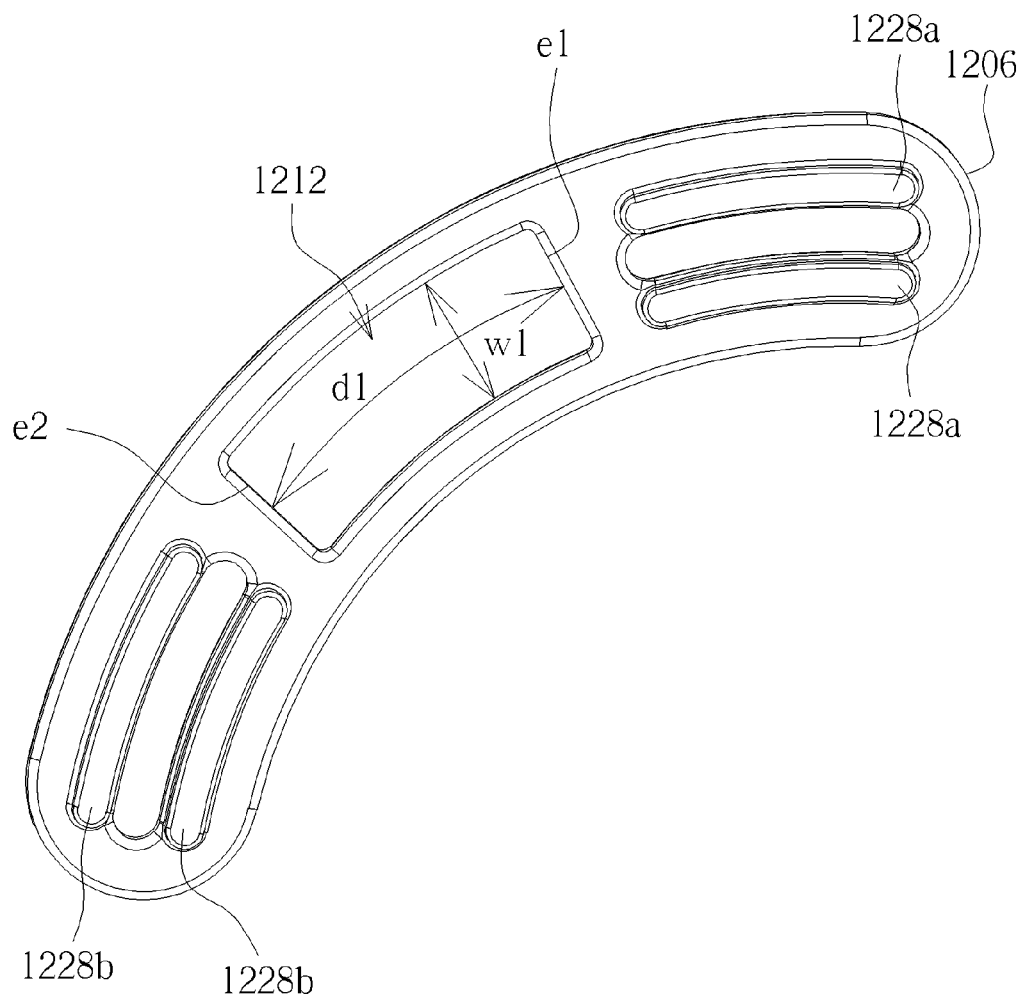
FIG. 21 is a rear view schematically illustrating the inner guide member according to the second embodiment of the invention.
Figure 22:
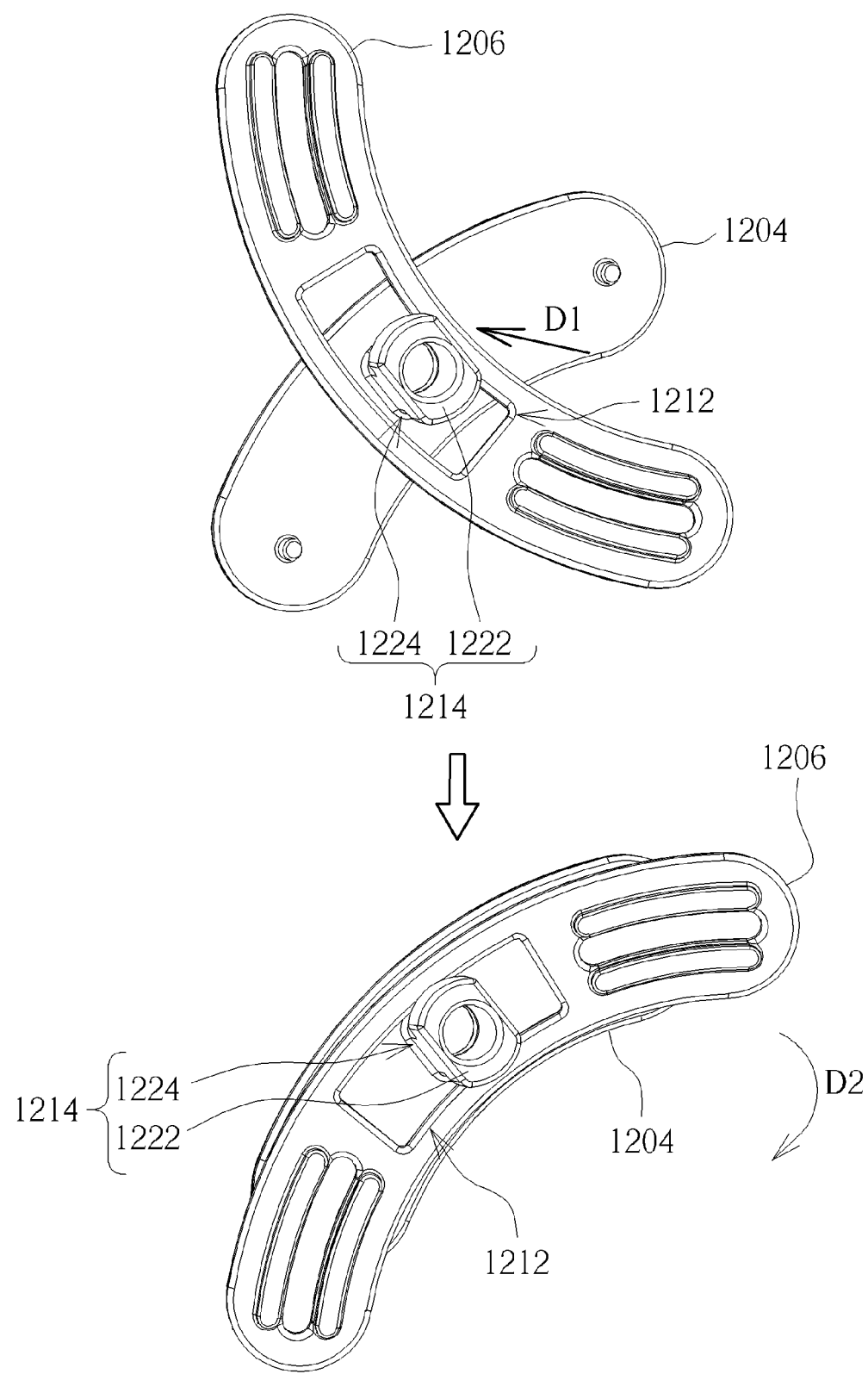
FIG. 22 is a perspective view schematically illustrating an assembly procedure of the outer guide member and the inner guide member according to the second embodiment of the invention.

In this embodiment, the guiding pin 1214 includes a neck portion 1224 fixed to the outer guide member 1204 and a head portion 1222 connected with the neck portion 1224. As shown in FIGS. 20 and 21, the sliding slot 1212 has a width W1 larger than or equal to a length L1 of the neck portion 1224 and a length L2 of the head portion 1222, larger than or equal to a width W2 of the neck portion 1224, and smaller than a width W3 of the head portion 1222. As shown in FIG. 22, to assemble the outer guide member 1204 and the inner guide member 1206, the head portion 1222 of the outer guide member 1204 passes through the sliding slot 1212 in a first direction D1 first and then the inner guide member 1206 rotates with respect to the outer guide member 1204 in a second direction D2 such that the neck portion 1224 movably passes through the sliding slot 1212 and the inner guide member 1206 is engaged with the outer guide member 1204 by the head portion 1222. When the inner guide member 1206 is movably inserted in the shallow groove 1211 together with the outer guide member 1204, the neck portion 1224 movably passes through the guiding slot 1210 and the head portion 1222 is used for selectively interfering with the first end E1 or the second end E2. Furthermore, when the engaging member 120' is attached to the frame 10, the outer guide member 1204 is sandwiched in between the frame 10 and the inner guide member 1206, is fixed to the guiding pin 1214 and covers the sliding slot 1212.

As shown in FIGS. 19 and 21, the sliding slot 1212 has a first edge e1 and a second edge e2 corresponding to the first end E1 and the second end E2 of the guiding slot 1210, respectively, and a distance d1 between the first edge e1 and the second edge e2 is shorter than a distance d2 between the first end E1 and the second end E2. In this embodiment, in response to the engaging member 120' rotating to the active position shown in FIG. 23, the first edge e1 is interfered with the guiding pin 1214. As shown in FIG. 23, when the engaging member 120' is located at the active position, the head portion 1222 of the guiding pin 1214 is used for interfering with at least one of the first end E1 and the first edge e1. Similarly, in response to the engaging member 120' rotating to the inactive position shown in FIG. 24, the second edge e2 is interfered with the guiding pin 1214. As shown in FIG. 24, when the engaging member 120' is located at the inactive position, the head portion 1222 of the guiding pin 1214 is used for interfering with at least one of the second end E2 and the second edge e2. Accordingly, the engaging member 120' is limited between the active position and the inactive position.

The rear cap 1208 is attached to a side of the engaging member 120' and opposite to the outer guide member 1204 and the inner guide member 1206 such that the guiding slot 1210 is blocked by the outer guide member 1204, the inner guide member 1206 and the rear cap 1208. In other words, the outer guide member 1204 and the inner guide member 1206 block entry to the guiding slot 1210 from the front of the engaging member 120', and the rear cap 1208 blocks entry to the guiding slot 1210 from the rear of the engaging member 120'. The outer guide member 1204, the inner guide member 1206 and the rear cap 1208 may be made of polypropolene and maybe made using the plastic injection molding process as well. The engaging member 120' may be made of nylon and may be made using the injection molding process. All of the parts could also be made out of different plastics/materials using different processes.

Figure 18:
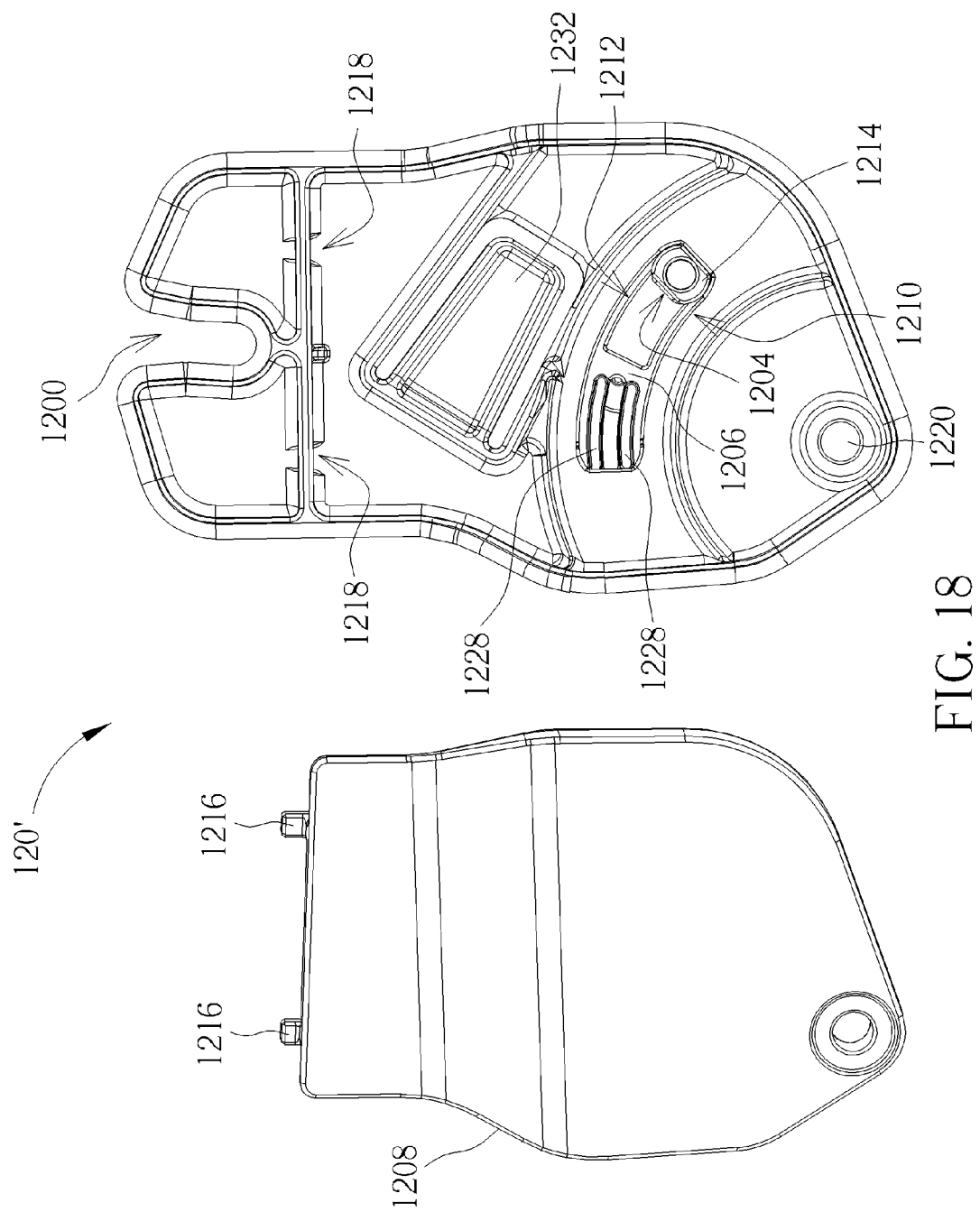
FIG. 18 is a rear view schematically illustrating the engaging member the disassembly of the rear cap and the engaging member according to the second embodiment of the invention.

As shown in FIG. 18, the rear cap 1208 has the two tabs 1216 on its top surface that are accepted into the corresponding holes 1218 in the engaging member 120', such that the rear cap 1208 is attached to the engaging member 120'. Furthermore, the other end of the rear cap 1208 may be attached by the axle 1220 that also goes through the side supporting member 100 (or the central supporting member 102) and the engaging member 120'. Accordingly, the engaging member 120' can pivot around the axle 1220 with respect to the frame 10. It should be noted that the rear cap 1208 could also be attached in other ways and could also be smaller to save material cost.

As shown in FIG. 19, the engaging member 120' further has two first channels 1226a and two second channels 1226b, wherein the first channels 1226a and the second channels 1226b are formed at opposite sides of the guiding slot 1210. As shown in FIG. 21, the inner guide member 1206 includes two first ribs 1228a and two second ribs 1228b, wherein the first ribs 1228a and the second ribs 1228b are formed at opposite sides of the sliding slot 1212. When the inner guide member 1206 is inserted in the shallow groove 1211 of the engaging member 120', the first ribs 1228a are movably inserted in the first channels 1226a correspondingly, and the second ribs 1228b are movably inserted in the second channels 1226b correspondingly, such that the inner guide member 1206 can move freely with respect to the engaging member 120'. It should be noted that the number of first ribs 1228a and second ribs 1228b and corresponding first channels 1226a and second channels 1226b can be determined according to practical applications and are not limited to the embodiment shown in FIGS. 19 and 21.

In this embodiment, the first channel 1226a has a first inner wall 12261 and a first opening 12262, wherein the first opening 12262 is opposite to the first inner wall 12261 and communicated with the guiding slot 1210. Also, the second channel 1226b has a second inner wall 12263 and a second opening 12264, wherein the second opening 12264 is opposite to the second inner wall 12263 and communicated with the guiding slot 1210. As shown in FIG. 23, in response to the engaging member 120' rotating to the active position, the first rib 1228a is interfered with the first inner wall 12261 of the first channel 1226, such that the inner guide member 1206 is maintained between the guiding pin 1214 and the first inner wall 12261 of the first channel 1226 of the engaging member 120'. As shown in FIG. 24, in response to the engaging member 120' rotating to the inactive position, the second rib 1228b is interfered with the second inner wall 12263 of the second channel 1226b.

As shown in FIGS. 15 and 16, the engaging member 120' is pivotally connected to the side supporting member 100 through the axle 1220, and the outer guide member 1204 is fixed on the side supporting member 100 through an axle 1230. Accordingly, the engaging member 120' can pivot around the axle 1220 with respect to the frame 10 between the active position shown in FIG. 15 and the inactive position shown in FIG. 16. Therefore, a user can deploy the engaging member 120' to the active position and then put the infant carrier 2 onto the engaging member 120' for seating an infant. When the engaging member 120' is deployed, the combination of the outer guide member 1204 and the inner guide member 1206 completely block access to the guiding slot 1210 and the sliding slot 1212 from the outside such that a finger of the infant can enter neither the guiding slot 1210 nor the sliding slot 1212, so as to prevent injury to the finger.

As shown in FIG. 23, when the engaging member 120' is deployed to the active position, the inner guide member 1206 is prevented from rotating counterclockwise by the guiding pin 1214 of the outer guide member 1204 and is prevented from rotating clockwise by the first channels 1226a in the engaging member 120'. As shown in FIG. 24, when the engaging member 120' is retracted to the inactive position, the guiding slot 1210 is still covered by the combination of the outer guide member 1204 and the inner guide member 1206. Also, in the inactive position, the inner guide member 1206 is contained by the second channels 1226b in the engaging member 120' and the guiding pin 1214 of the outer guide member 1204.

Referring to FIGS. 15 and 16 again, each of the side supporting members 100 and the central supporting member 102 has the retaining portion 108 and each of the engaging member 120' has the flexible portion 1232 biased towards the retaining portion 108. It should be noted that only one retaining portion 108 and only one flexible portion 1232 are shown in FIG. 15 due to the viewing angle. As shown in FIG. 15, the flexible portion 1232 is interfered with the retaining portion 108 when the engaging member 120' is located at the active position, such that the engaging member 120' is maintained at the active position. To release and retract the engaging member 120', the user simply pushes the flexible portion 1232 inward and pushes the engaging member 120' back to the inactive position, so that the flexible portion 1232 is disengaged from the retaining portion 108 when the engaging member 120' is located at the inactive position. To deploy the engaging member 120', the user pulls the engaging member 120' forward and the flexible portion 1232 is interfered with the retaining portion 108 again, so as to lock the engaging member 120' at the inactive position automatically.

The engaging member 120' of the invention can deploy when they are needed and also retract when they are not in use. The aforesaid manner makes it very convenient for the child because the engaging members 120' are not in the way when a toddler seat of the side-by-side duo baby carriage 1' is used. It is also convenient for the caregiver because the engaging members 120' are attached to the frame 10 of the side-by-side duo baby carriage 1' and cannot be lost when they are not in use.

Figure 25:
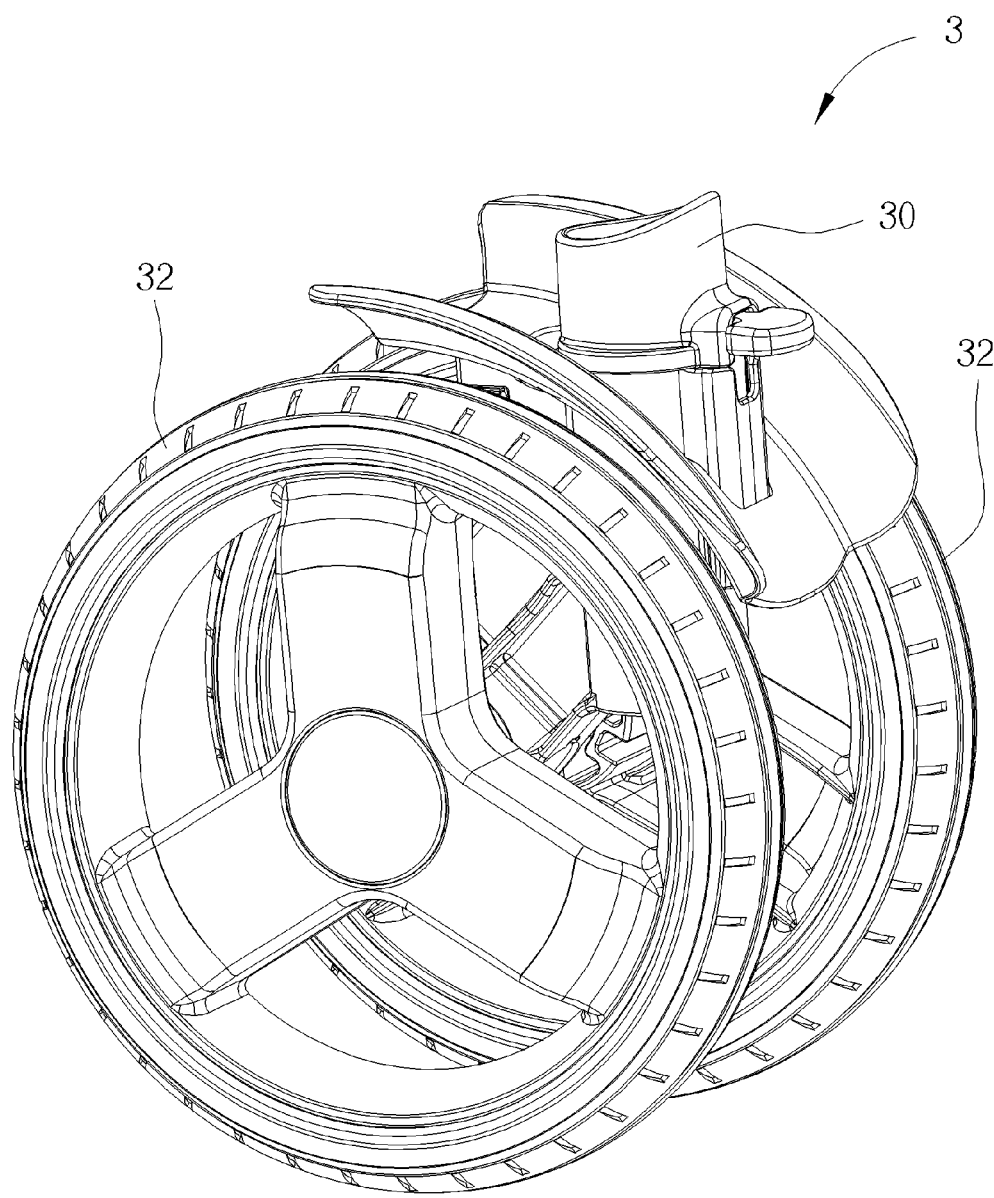
FIG. 25 is a perspective view schematically illustrating a suspension mechanism according to a third embodiment of the invention.
Figure 26:
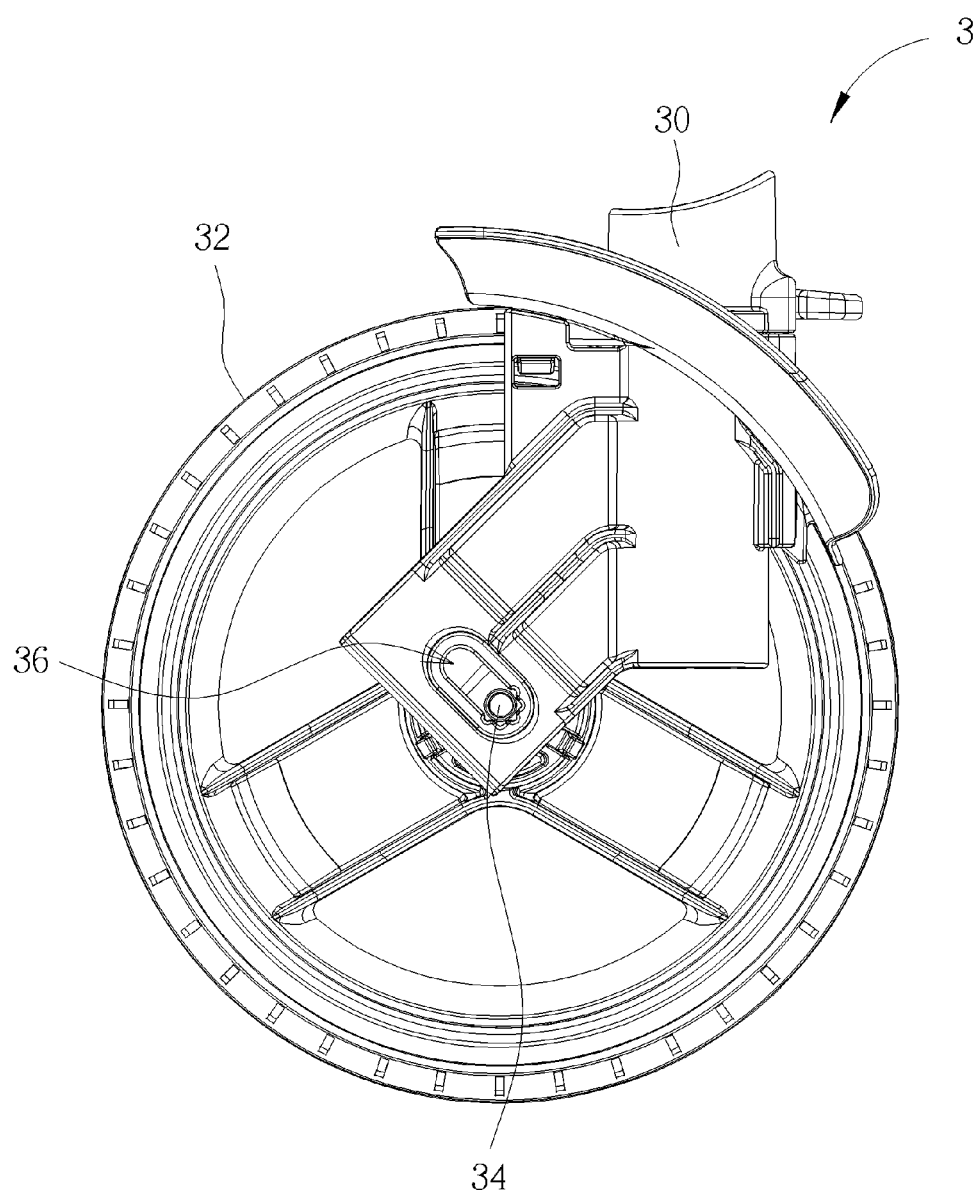
FIG. 26 is a side view schematically illustrating the suspension mechanism according to the third embodiment of the invention.
Figure 27:
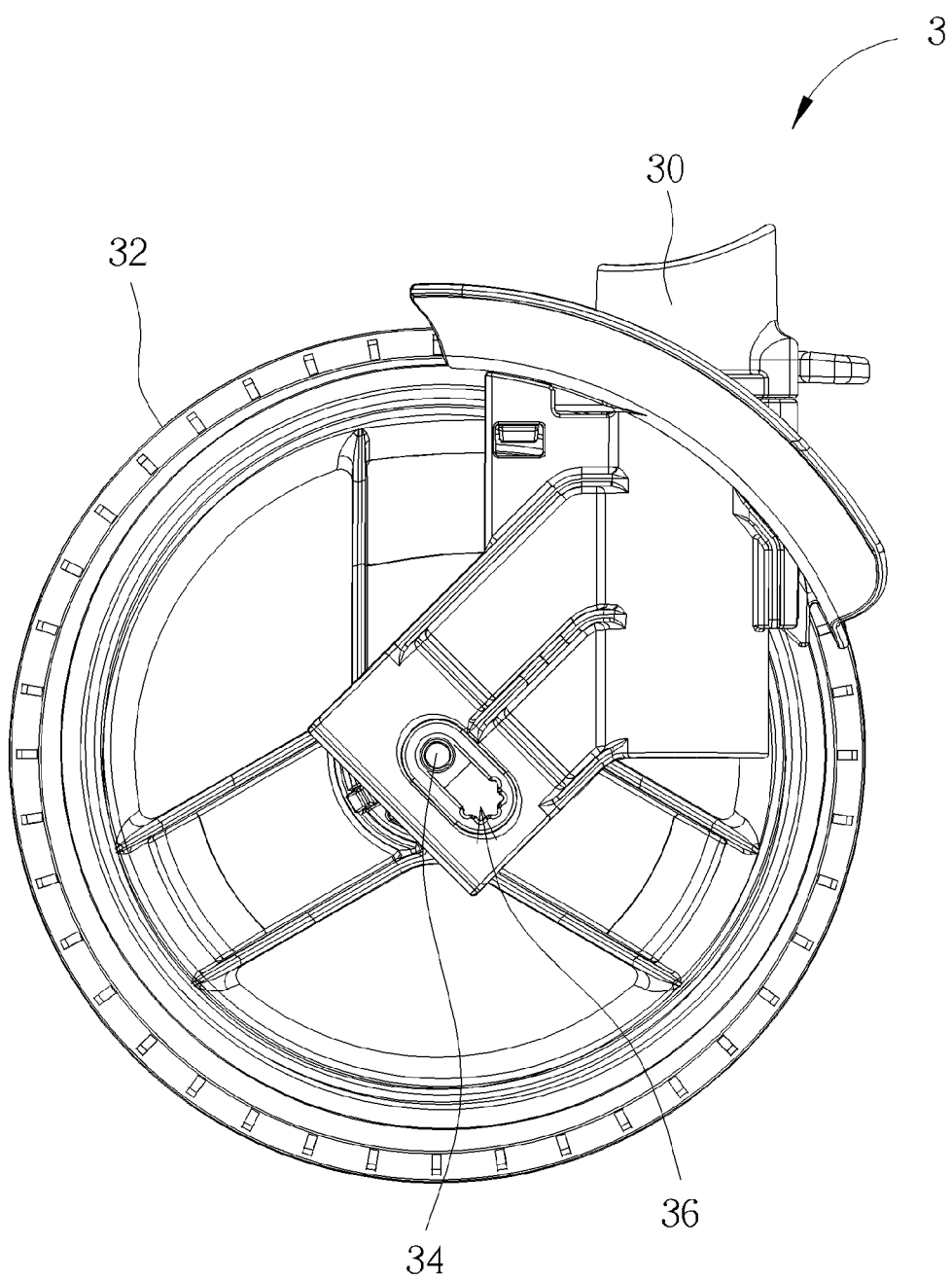
FIG. 27 is a side view schematically illustrating the suspension mechanism executing shock absorption according to the third embodiment of the invention.

FIGS. 25 to 27 illustrate a third embodiment of the invention. In this embodiment, a suspension mechanism 3 can be applied to the aforesaid side-by-side duo baby carriage 1 or 1'.

As shown in FIGS. 25 to 27, the suspension mechanism 3 comprises a wheel supporting member 30, two wheels 32 and an axle 34. The wheel supporting member 30 is connected to the frame 10. The wheel supporting member 30 has an oblique slot 36 in the travel direction A2 shown in FIGS. 3 and 14 relative to the frame 10. The axle 34 is movably inserted in the oblique slot 36. The wheels 32 are connected to the axle 34. In this embodiment, the oblique slot 36 allows the axle 34 to move obliquely upward and downward when compressed, as shown in FIGS. 26 and 27. Accordingly, the suspension mechanism 3 can work not only as a means of comforting the ride, but also as a shock absorber when the wheels 32 are impacted with objects from the front or back.

As mentioned in the above, since the traverse connecting member is spaced apart from the handling member and the central supporting member terminates at the traverse connecting member so as to form the T-shaped structure, a user can freely grip the entire handling member without interference accordingly. Furthermore, the baby carriage of the invention is equipped with the two individual engaging mechanisms for engaging with the two infant carriers. Since the two engaging mechanisms are offset either in the travel direction or in the height direction relative to the frame, the two infant carriers can nest closer together without making the frame of the baby carriage overly wide. Moreover, the baby carriage of the invention may be equipped with the single engaging mechanism for engaging with the single infant carrier according to practical applications, wherein the engaging mechanism is capable of rotating between the active position and the inactive position through the cooperation between neither the guiding slot and the sliding slot and the guiding pin.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A baby carriage capable of conveying an infant carrier comprising:
   a frame; and
   an engaging mechanism disposed on the frame and used for engaging with the infant carrier, the engaging mechanism including an engaging member pivotally connected to the frame, the engaging member having a guiding slot with a first end and a second end opposite to each other, the frame including a guiding pin movably inserted in the guiding slot, such that the engaging member is operable for selectively rotating to an active position where the engaging member is allowed to engage with the infant carrier when the guiding pin moves to the first end or rotating to an inactive position where the engaging member is prohibited from engaging with the infant carrier when the guiding pin moves to the second end, the frame further including a retaining portion, the engaging member including a flexible portion biased towards the retaining portion, and when the flexible portion and the first end are interfered with the retaining portion and the guiding pin, respectively, the engaging member being maintained at the active position.

2. The baby carriage of claim 1, wherein when the flexible portion is pressed to prevent from interfering with the retaining portion, the engaging member is capable of rotating to the inactive position.

3. The baby carriage of claim 1, wherein the engaging mechanism further includes an inner guide member sandwiched in between the frame and the engaging member, movably disposed along the guiding pin and covering the guiding slot.

4. The baby carriage of claim 3, wherein the inner guide member has a sliding slot communicated with the guiding slot, the guiding pin is movably inserted in the sliding slot, the sliding slot has a first edge and a second edge corresponding to the first end and the second end, respectively, and a distance between the first edge and the second edge is shorter than that between the first end and the second end.

5. The baby carriage of claim 3, wherein the inner guide member has a sliding slot communicated with the guiding slot, the guiding pin is movably inserted in the sliding slot, the sliding slot has a first edge corresponding to the first end, and in response to the engaging member rotating to the active position, the first edge is interfered with the guiding pin.

6. The baby carriage of claim 3, wherein the inner guide member has a sliding slot communicated with the guiding slot, the guiding pin is movably inserted in the sliding slot, the sliding slot has a second edge corresponding to the second end, and in response to the engaging member rotating to the inactive position, the second edge is interfered with the guiding pin.

7. The baby carriage of claim 3, wherein the engaging member further has a first channel with an first inner wall, the inner guide member includes a first rib movably inserted in the first channel, and in response to the engaging member rotating to the active position, the first rib is interfered with the first inner wall.

8. The baby carriage of claim 3, wherein the engaging member further has a second channel with a second inner wall, the inner guide member includes a second rib movably inserted in the second channel, and in response to the engaging member rotating to the inactive position, the second rib is interfered with the second inner wall.

9. The baby carriage of claim 3, wherein the inner guide member has a sliding slot communicated with the guiding slot, the guiding pin is movably inserted in the sliding slot, and the engaging mechanism further includes an outer guide member sandwiched in between the frame and the inner guide member, fixed to the guiding pin and covering the sliding slot.

* * * * *